United States Patent
Nishiumi et al.

(10) Patent No.: US 6,778,190 B1
(45) Date of Patent: * Aug. 17, 2004

(54) THREE-DIMENSIONAL IMAGE PROCESSING APPARATUS

(75) Inventors: Satoshi Nishiumi, Kyoto (JP); Kazuo Koshima, Kyoto (JP); Takumi Kawagoe, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/309,375

(22) Filed: May 11, 1999

Related U.S. Application Data

(63) Continuation of application No. 08/836,739, filed as application No. PCT/JP96/02931 on Oct. 9, 1996, now Pat. No. 5,973,704.

(30) Foreign Application Priority Data

| Oct. 9, 1995 | (JP) | ............................................. 7-288006 |
| Jun. 13, 1996 | (JP) | ............................................. 8-152728 |

(51) Int. Cl.⁷ .......................... G09G 5/00; G06T 15/00
(52) U.S. Cl. ...................................... 345/619; 345/419
(58) Field of Search ................................ 345/419, 679, 345/473, 672, 680, 418, 474, 619; 463/33, 38

(56) References Cited

U.S. PATENT DOCUMENTS

| 3,666,900 | A | 5/1972 | Rothweiler et al. |
| 3,729,129 | A | 4/1973 | Fletcher et al. |
| 3,827,313 | A | 8/1974 | Kiessling |
| 4,148,014 | A | 4/1979 | Burson |
| 4,161,726 | A | 7/1979 | Burson et al. |
| 4,315,113 | A | 2/1982 | Fisher et al. |
| 4,359,222 | A | 11/1982 | Smith, III et al. |
| 4,467,412 | A | 8/1984 | Hoff |
| 4,469,330 | A | 9/1984 | Asher |
| 4,485,457 | A | 11/1984 | Balaska et al. |
| 4,538,035 | A | 8/1985 | Pool |

(List continued on next page.)

FOREIGN PATENT DOCUMENTS

| DE | 32 04 428 A1 | 8/1983 |
| EP | 268 419 | 5/1988 |
| EP | 0 470 615 | 2/1992 |

(List continued on next page.)

OTHER PUBLICATIONS

US 6,017,271, 1/2000, Miyamoto et al. (withdrawn)
Super Mario 64 Player's Guide, Nintendo of America, 1996.
Nintendo Power, "The Fun Machine" for Nintendo 64, 1996.
Nintendo Power, vol. 80, pp. 20–27, Jan. 1996.

(List continued on next page.)

*Primary Examiner*—Jeffrey Brier
*Assistant Examiner*—Chantè Harrison
(74) *Attorney, Agent, or Firm*—Nixon & Vanderhye P.C.

(57) ABSTRACT

A three-dimension image processing apparatus includes a CPU. When the CPU detects by collision determination that another object, e.g., a wall, is existent between an operable object and a camera, it calculates such a moving angle of the camera that an eye of the camera to the operable object is not obstructed by the other object. The camera is moved in accordance with the moving angle to a position where the operable object and the other object existing in a photographed three-dimensional space are displayed on a display.

12 Claims, 27 Drawing Sheets

U.S. PATENT DOCUMENTS

| | | |
|---|---|---|
| 4,552,360 A | 11/1985 | Bromley et al. |
| 4,575,591 A | 3/1986 | Lugaresi |
| 4,587,510 A | 5/1986 | Kim |
| 4,620,176 A | 10/1986 | Hayes |
| 4,639,225 A | 1/1987 | Washizuka |
| 4,659,313 A | 4/1987 | Kuster et al. |
| 4,685,678 A | 8/1987 | Frederiksen |
| 4,748,441 A | 5/1988 | Brzezinski |
| 4,766,423 A | 8/1988 | Ono et al. |
| 4,783,812 A | 11/1988 | Kaneoka |
| 4,789,932 A | 12/1988 | Cutler et al. |
| 4,799,677 A | 1/1989 | Frederiksen |
| 4,858,930 A | 8/1989 | Sato |
| 4,868,780 A | 9/1989 | Stern |
| 4,875,164 A | 10/1989 | Monfort |
| 4,887,230 A | 12/1989 | Noguchi et al. |
| 4,887,966 A | 12/1989 | Gellerman |
| 4,890,832 A | 1/1990 | Komaki |
| 4,916,440 A | 4/1990 | Faeser et al. |
| 4,924,216 A | 5/1990 | Leung |
| 4,926,372 A | 5/1990 | Nakagawa |
| 4,933,670 A | 6/1990 | Wislocki |
| 4,949,298 A | 8/1990 | Nakanishi et al. |
| 4,974,192 A | 11/1990 | Face et al. |
| 4,976,429 A | 12/1990 | Nagel |
| 4,976,435 A | 12/1990 | Shatford et al. |
| 4,984,193 A | 1/1991 | Nakagawa |
| 5,001,632 A | 3/1991 | Hall-Tipping |
| 5,012,230 A | 4/1991 | Yasuda |
| D316,879 S | 5/1991 | Shulman et al. |
| 5,014,982 A | 5/1991 | Okada et al. |
| 5,016,876 A | 5/1991 | Loffredo |
| D317,946 S | 7/1991 | Tse |
| 5,046,739 A | 9/1991 | Reichow |
| 5,095,798 A | 3/1992 | Okada et al. |
| 5,146,557 A | 9/1992 | Yamrom et al. |
| 5,160,918 A | 11/1992 | Saposnik et al. |
| 5,203,563 A | 4/1993 | Loper, III |
| 5,207,426 A | 5/1993 | Inoue et al. |
| 5,213,327 A | 5/1993 | Kitaue |
| 5,226,136 A | 7/1993 | Nakagawa |
| 5,237,311 A | 8/1993 | Mailey et al. |
| 5,245,320 A | 9/1993 | Bouton |
| 5,259,626 A | 11/1993 | Ho |
| 5,273,294 A | 12/1993 | Amanai |
| 5,276,831 A | 1/1994 | Nakanishi et al. |
| 5,286,024 A | 2/1994 | Winblad |
| 5,290,034 A | 3/1994 | Hineman |
| 5,291,189 A | 3/1994 | Otake et al. |
| 5,317,714 A | 5/1994 | Nakagawa et al. |
| 5,327,158 A | 7/1994 | Takahashi et al. |
| 5,329,276 A | 7/1994 | Hirabayashi |
| 5,337,069 A | 8/1994 | Otake et al. |
| 5,357,604 A | 10/1994 | San et al. |
| 5,358,259 A | 10/1994 | Best |
| 5,371,512 A | 12/1994 | Otake et al. |
| 5,388,841 A | 2/1995 | San et al. |
| 5,388,990 A | 2/1995 | Beckman |
| 5,390,937 A | 2/1995 | Sakaguchi et al. |
| 5,393,070 A | 2/1995 | Best |
| 5,393,071 A | 2/1995 | Best |
| 5,393,072 A | 2/1995 | Best |
| 5,393,073 A | 2/1995 | Best |
| 5,394,168 A | 2/1995 | Smith, III et al. |
| D357,712 S | 4/1995 | Wu |
| 5,415,549 A * | 5/1995 | Logg et al. ............. 345/431 X |
| 5,421,590 A | 6/1995 | Robbins |
| 5,426,763 A | 6/1995 | Okada |
| 5,436,640 A | 7/1995 | Reeves |
| 5,437,464 A | 8/1995 | Terasima et al. |
| 5,451,053 A | 9/1995 | Garrido |
| 5,453,763 A | 9/1995 | Nakagawa et al. |
| D363,092 S | 10/1995 | Hung |
| 5,459,487 A | 10/1995 | Bouton |
| 5,473,325 A | 12/1995 | McAlindon |
| 5,512,920 A | 4/1996 | Gibson |
| 5,513,307 A | 4/1996 | Naka et al. |
| 5,515,044 A | 5/1996 | Glatt |
| 5,551,693 A | 9/1996 | Goto et al. |
| 5,551,701 A | 9/1996 | Bouton et al. |
| 5,558,329 A | 9/1996 | Liu |
| 5,563,629 A | 10/1996 | Caprara |
| 5,566,280 A | 10/1996 | Fukui et al. |
| D375,326 S | 11/1996 | Yokoi et al. |
| 5,577,735 A | 11/1996 | Reed et al. |
| 5,589,854 A | 12/1996 | Tsai |
| 5,593,350 A | 1/1997 | Bouton et al. |
| 5,599,232 A | 2/1997 | Darling |
| 5,607,157 A | 3/1997 | Nagashima |
| 5,615,083 A | 3/1997 | Burnett |
| 5,624,117 A | 4/1997 | Ohkubo et al. |
| 5,628,686 A | 5/1997 | Svancarek et al. |
| 5,632,680 A | 5/1997 | Chung |
| 4,870,389 A | 6/1997 | Ishiwata et al. |
| 5,640,177 A | 6/1997 | Hsu |
| 5,643,087 A | 7/1997 | Marcus et al. |
| 5,649,862 A | 7/1997 | Sakaguchi et al. |
| 5,653,637 A | 8/1997 | Tai |
| 5,663,747 A | 9/1997 | Shulman |
| 5,670,955 A | 9/1997 | Thorne, III et al. |
| 5,680,534 A | 10/1997 | Yamato et al. |
| 5,684,512 A | 11/1997 | Schoch et al. |
| 5,691,898 A | 11/1997 | Rosenberg et al. |
| 5,694,153 A | 12/1997 | Aoyagi et al. |
| 5,704,837 A | 1/1998 | Iwasaki et al. |
| 5,706,029 A | 1/1998 | Tai |
| 5,714,981 A | 2/1998 | Scott-Jackson et al. |
| 5,724,497 A | 3/1998 | San et al. |
| 5,731,806 A | 3/1998 | Harrow et al. |
| 5,734,373 A | 3/1998 | Rosenberg et al. |
| 5,734,376 A | 3/1998 | Hsien |
| 5,734,807 A | 3/1998 | Sumi |
| 5,759,100 A | 6/1998 | Nakanishi |
| 5,769,718 A | 6/1998 | Rieder |
| 5,769,719 A | 6/1998 | Hsu |
| 5,784,051 A | 7/1998 | Harrow et al. |
| 5,785,597 A | 7/1998 | Shinohara |
| 5,786,807 A | 7/1998 | Couch et al. |
| 5,791,994 A | 8/1998 | Hirano et al. |
| 5,793,356 A | 8/1998 | Svancarek et al. |
| 5,804,781 A | 9/1998 | Okabe |
| 5,805,138 A | 9/1998 | Brawne et al. |
| 5,808,591 A | 9/1998 | Mantani |
| 5,816,921 A | 10/1998 | Hosokawa |
| 5,820,462 A | 10/1998 | Yokoi et al. |
| 5,830,066 A | 11/1998 | Goden et al. |
| 5,838,330 A | 11/1998 | Ajima |
| 5,850,230 A | 12/1998 | San et al. |
| 5,862,229 A | 1/1999 | Shimizu |
| 5,867,051 A | 2/1999 | Liu |
| 5,872,999 A | 2/1999 | Koizumi et al. |
| 5,877,749 A | 3/1999 | Shiga et al. |
| 5,880,709 A | 3/1999 | Itai et al. |
| 5,883,628 A | 3/1999 | Mullaly et al. |
| 5,896,125 A | 4/1999 | Niedzwiecki |
| 5,898,424 A | 4/1999 | Flannery |
| 5,946,004 A | 8/1999 | Kitamura et al. |
| 5,963,196 A | 10/1999 | Nishiumi et al. |
| 5,973,704 A | 10/1999 | Nishiumi et al. |
| 5,984,785 A | 11/1999 | Takeda et al. |
| 6,001,015 A * | 12/1999 | Nishiumi et al. ............. 463/38 |

| | | |
|---|---|---|
| 6,002,351 A | 12/1999 | Takeda et al. |
| 6,007,428 A | 12/1999 | Nishiumi et al. |
| 6,020,876 A | 2/2000 | Rosenberg et al. |
| 6,022,274 A | 2/2000 | Takeda et al. |
| 6,034,669 A | 3/2000 | Chiang et al. |
| 6,036,495 A | 3/2000 | Marcus et al. |
| 6,042,478 A | 3/2000 | Ng |
| 6,050,718 A | 4/2000 | Schena et al. |
| 6,050,896 A | 4/2000 | Hanado et al. |
| 6,067,077 A | 5/2000 | Martin et al. |
| 6,071,194 A | 6/2000 | Sanderson et al. |
| 6,078,329 A | 6/2000 | Umeki et al. |
| 6,102,803 A | 8/2000 | Takeda et al. |
| 6,126,544 A | 10/2000 | Kojima |
| 6,126,545 A | 10/2000 | Takahashi et al. |
| 6,146,277 A | 11/2000 | Ikeda |
| 6,149,519 A | 11/2000 | Osaki et al. |
| 6,154,197 A | 11/2000 | Watari et al. |
| 6,169,540 B1 | 1/2001 | Rosenberg et al. |
| 6,175,366 B1 | 1/2001 | Watanabe et al. |
| 6,186,896 B1 | 2/2001 | Takeda et al. |
| 6,196,919 B1 | 3/2001 | Okubo |
| 6,200,253 B1 | 3/2001 | Nishiumi et al. |
| 6,219,033 B1 | 4/2001 | Rosenberg et al. |
| 6,491,585 B1 * | 12/2002 | Miyamoto et al. ............ 463/33 |

FOREIGN PATENT DOCUMENTS

| | | |
|---|---|---|
| EP | 553 532 | 8/1993 |
| EP | 685 246 | 12/1995 |
| EP | 724 220 | 7/1996 |
| GB | 2 234 575 A | 2/1991 |
| GB | 0 431 723 A2 | 6/1991 |
| GB | 2 244 546 | 12/1991 |
| GB | 2 263 802 | 8/1993 |
| JP | 50-22475 | 3/1975 |
| JP | 57-2084 | 1/1982 |
| JP | 57-18236 | 1/1982 |
| JP | 57-136217 | 8/1982 |
| JP | 59-40258 | 3/1984 |
| JP | 59-121500 | 7/1984 |
| JP | 61-198286 | 9/1986 |
| JP | 62-269221 | 11/1987 |
| JP | 2-41342 | 3/1990 |
| JP | 2-68404 | 5/1990 |
| JP | 2-283390 | 11/1990 |
| JP | 3-16620 | 1/1991 |
| JP | 3-248215 | 11/1991 |
| JP | 4-20134 | 2/1992 |
| JP | 4-42029 | 2/1992 |
| JP | 4-104893 | 9/1992 |
| JP | 4-291468 | 10/1992 |
| JP | 5-100759 | 4/1993 |
| JP | 5-19925 | 5/1993 |
| JP | 5-177057 | 7/1993 |
| JP | 5-241502 | 9/1993 |
| JP | 6-54962 | 3/1994 |
| JP | 6-68238 | 3/1994 |
| JP | 6-110602 | 4/1994 |
| JP | 6-114683 | 4/1994 |
| JP | 6-190145 | 7/1994 |
| JP | 6-190147 | 7/1994 |
| JP | 6-205010 | 7/1994 |
| JP | 6-61390 | 8/1994 |
| JP | 6-285259 | 10/1994 |
| JP | 6-315095 | 11/1994 |
| JP | 07088252 | 4/1995 |
| JP | 7-104930 | 4/1995 |
| JP | 7-144069 | 6/1995 |
| JP | 7-222865 | 8/1995 |
| JP | 7-288006 | 10/1995 |
| JP | 7-317230 | 12/1995 |
| JP | 8-45392 | 2/1996 |
| JP | 9-56927 | 3/1997 |
| JP | WO97/32641 | 12/1997 |
| WO | 92/09347 | 6/1992 |
| WO | 94/12999 | 6/1994 |
| WO | 97/17651 | 5/1997 |

OTHER PUBLICATIONS

Nintendo Power Employee Shosinkai Reports, 14 pages, Nov. 24–26, 1995.
Sega Force/Saturn Tech Specs, Data Information, 1997.
Sega Force/Saturn Peripherals, Data Information, 1997–99.
*3D Ballz Instruction Booklet,* Accolade, San Jose, California, #3050–00231 Rev. A.
6 Photographs of Sony PlayStation: 1) top case and compact disk; 2) hand controller; 3) internal circuit boards (top view); 4) internal ciucuit boards (top view); 5) compact disk reader (bottom view); and internal main circuit board (bottom view).
*Knuckles Chaotix Instruction Manual,* Sega, Redwood City, California, #84503 (1995).
*Nintendo Power,* vol. 30, p. 22, PilotWings article.
*Nintendo Power,* vol. 31, p. 35, PilotWings article.
*Nintendo Power,* vol. 31, pp. 74–76, PilotWings article.
*Nintendo Power,* vol. 38, p. 25, PilotWings article.
*Nintendo Power,* vol. 46, PilotWings article.
*PilotWings Instruction Booklet,* Super Nintendo Entertainment System, SNS–PW–USA, copyright 1991.
*PilotWings,* It's a Festival of Flight, Top Secret Password Nintendo Player's Guide, pp. 82–83 and 160, 1991.
*Sega Genesis 32X Instruction Manual,* Sega, Redwood City California, #672–2116 (1994).
*Sega Genesis Instruction Manual,* Sega, Hayward, California, #3701–926–0–01 (1994).
*Sonic 2 The Hedgehog Instruction Manual,* Sega, Hayward, California, #672–0944 3701–925–0–01 (1992).
Sony PlayStation Instruction Manual, and informational materials, Sony Computer Entertainment Inc. 1995.
*IBM Technical Disclosure Bulletin,* vol. 37, No. 08, Aug. 1994, pp. 73–74, "Analog Joystick Interface Emulation using a Digital Counter".
Drucker et al., "CINEMA: A System for Procedural Camera Movements", *Proceedings of the Symposium on Interactive 3D Graphics,* Cambridge, MA Mar. 29–Apr. 1, 1992, pp. 67–70.

* cited by examiner

FIG. 10

| 1 BYTE | B | A | G | START | ↑ | ↓ | ← | → |
|---|---|---|---|---|---|---|---|---|
| 2 BYTE | JSRST | 0 | L | R | E | D | C | F |
| 3 BYTE | X ORDINATE |||||||||
| 4 BYTE | Y ORDINATE |||||||||

TRIANGLE POLYGON

THREE-DIMENSIONAL IMAGE PROCESSING APPARATUS

This application is a continuation of Ser No. 08/836,739 files May, 25, 1997 now U.S. Pat. No. 5,973,709 which is a 371 of PCT/JP96/02931 filed Oct. 9,1996.

FIELD OF THE INVENTION

This invention relates to a three-dimensional image processing apparatus and an external memory device to be used therewith. More particularly, the invention relates to a three-dimensional image processing apparatus which displays on a display device an image of a player controlled object or other objects, existing in three-dimensional space, from the perspective of a predetermined "camera" position (the point of view).

BACKGROUND AND SUMMARY OF THE INVENTION

The conventional so-called 3D (3-Dimensional) video game uses player controlled or operable objects (objects operable by an operator) configured with three-dimensional data when viewed by an apparent camera at predetermined angles and distances, thereby obtaining displayed images. In the conventional game, however, if a background image (e.g., a wall) or an object used as an opponent character (another object) comes between the player controlled object and the "camera", or if another object is moved to interrupt the line of sight between the operable object and the camera, the operable object can not be viewed in the three-dimensional world. To this end, there has been a limitation in the conventional 3D games in that the other object has to be arranged by a program not to exist between the operable object and the camera.

It is therefore an object of the present invention to provide an image processing apparatus which is capable of displaying an operable object at substantially all times and hence free from limitation in arranging other objects.

The illustrative image processing apparatus displays on a display an operable object image and another object existing in a three-dimensional space from a predetermined viewing or "photographic" position. The image processing apparatus includes an external memory which stores operable object and the other object data and a predetermined program. The system uses an input controller which inputs data which alters the position of the operable object in the three-dimensional space. Operable object position data generating hardware and software generates operable object position data so as to alter the position of the operable object in the three-dimensional space based on the data input by the input controller. The three-dimensional data is created based on the data stored in the external memory and the operable object position data. Point of view position data is generated representing photographing position data in the three-dimensional space for displaying the operable object. The system detects whether or not the other object exists between the "camera" view position and the operable object position. If so, the system alters the photographing position data such that the other object is not existent between the photographing position and the operable object position when the detecting means detects existence of the other object. The system creates display data for displaying the image of the operable object photographed from a predetermined position in the three-dimensional space based on the three-dimensional data and the photographing position data; and image signal generating circuitry outputs an image signal to the display based on the generated display data.

The system determines whether or not there is a possibility of a collision between the operable object and a polygon plane of the other object. If there is a possibility of a collision of the operable object with the other object, the camera position is changed so that the other object does not exist between the operable object and the camera. Therefore, the operable object is "photographed" without interference by the other object.

In accordance with the present invention, even if another object is permitted to freely move, it is possible to display at substantially all times an operable object on a screen of a display. Consequently, if the present invention is applied to a game apparatus, the operable object can be displayed at all times on a display, even for a game that involves an operable object and a number of other objects moving around on the display screen.

The above and other objects, features, aspects, and advantages of the present invention will become more apparent from the ensuing detailed description of the present invention when taken in conjunction with the accompanying drawings.

BRIEF DESCRIPTION OF THE DRAWINGS

FIG. 10 shows illustrative data from a controller's analog joystick of the respective keys/buttons;

EMBODIMENTS

Figure 1:
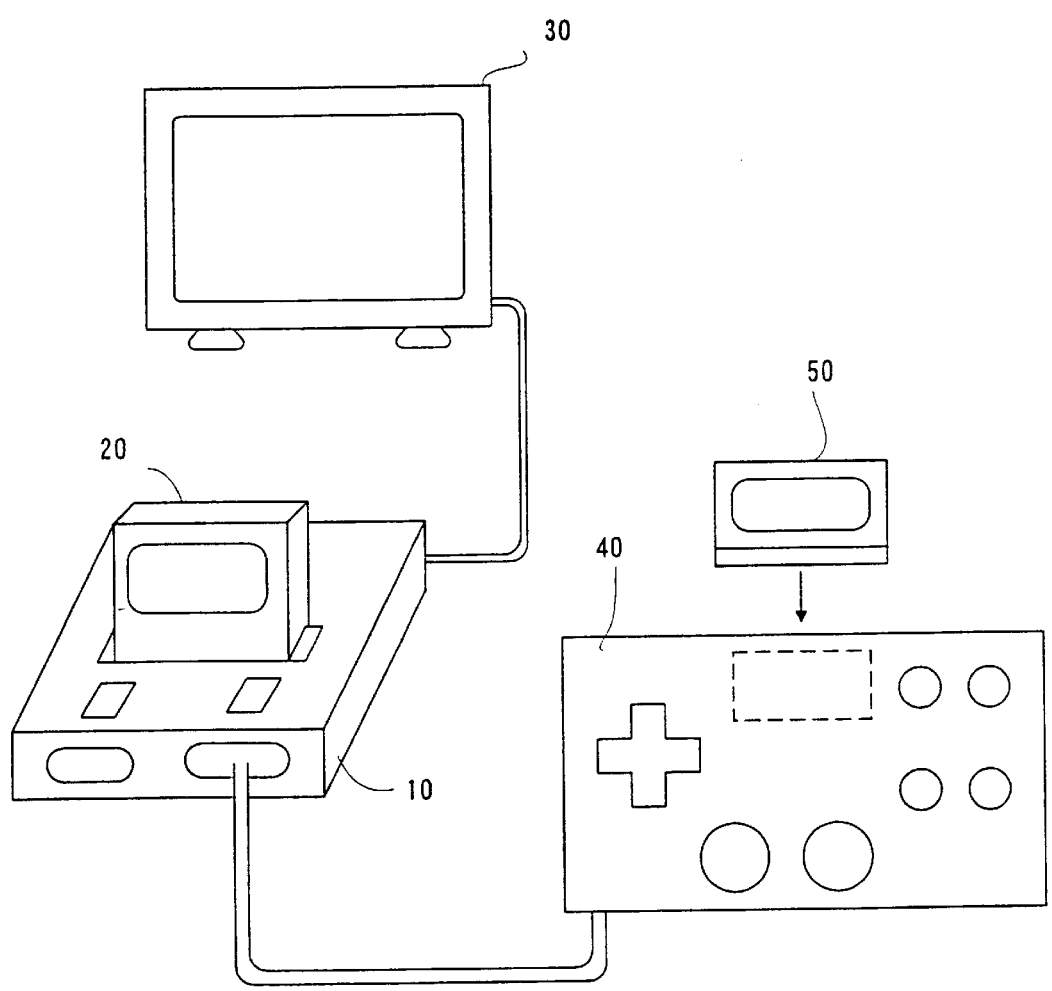
FIG. 1 is an illustrative schematic external view showing one embodiment of an exemplary image processing system.
Figure 7:
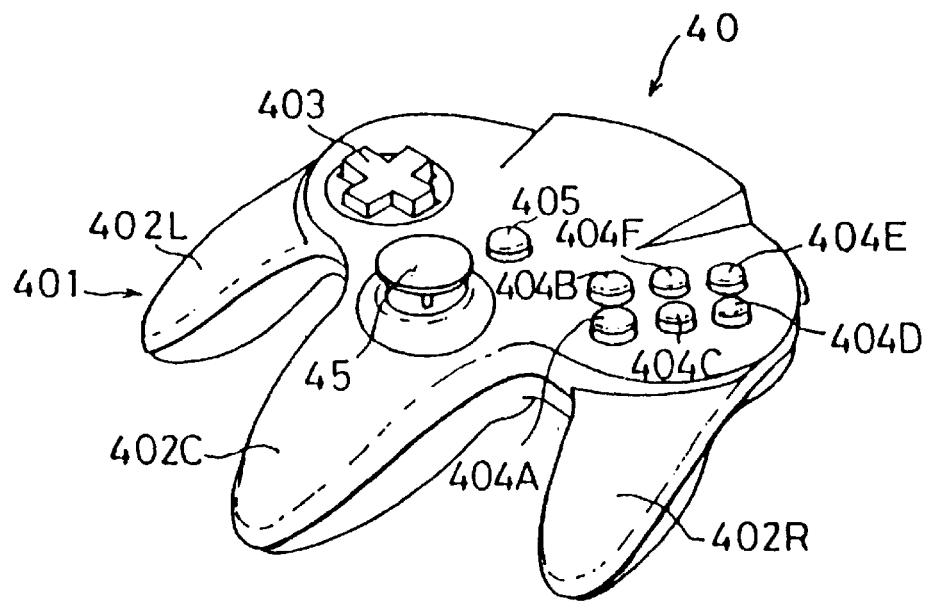
FIG. 7 is a perspective view of a controller of the FIG. 2 embodiment as viewed from the top.
Figure 8:
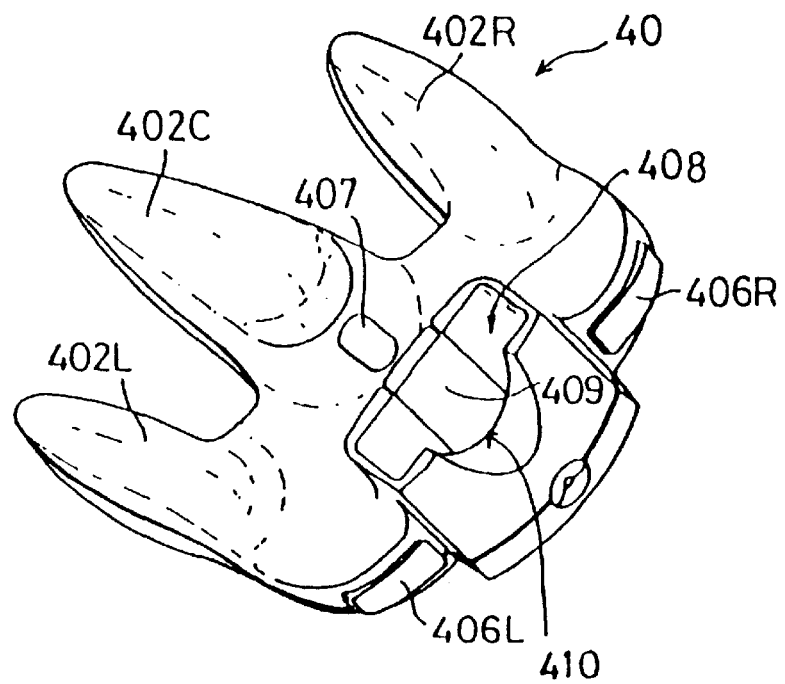
FIG. 8 is a perspective view of the controller of the FIG. 2 embodiment as viewed from the bottom.

FIG. 1 depicts an exemplary image processing system according to one embodiment of the present invention. The image processing system is for example a video game system, which comprises an image processing apparatus 10, a ROM cartridge 20 (as one example of an external memory device), a display 30 (as one example of a display means) connected to the image processing apparatus main body 10, a controller 40 as one example of a player controller or operating device. The preferred controller is shown in FIGS. 7 and 8 and is described below. A RAM cartridge 50 is one example of an extension device detachably attached to the controller 40. The external memory device stores image data and program data for image processing for games, and audio data for music, sound effects, etc. A CD-ROM or a magnetic disc may alternatively be employed in place of the ROM cartridge. Where the image processing system of this example is applied to a personal computer, an input device such as a keyboard or a mouse is used as the player operating device.

Figure 2:
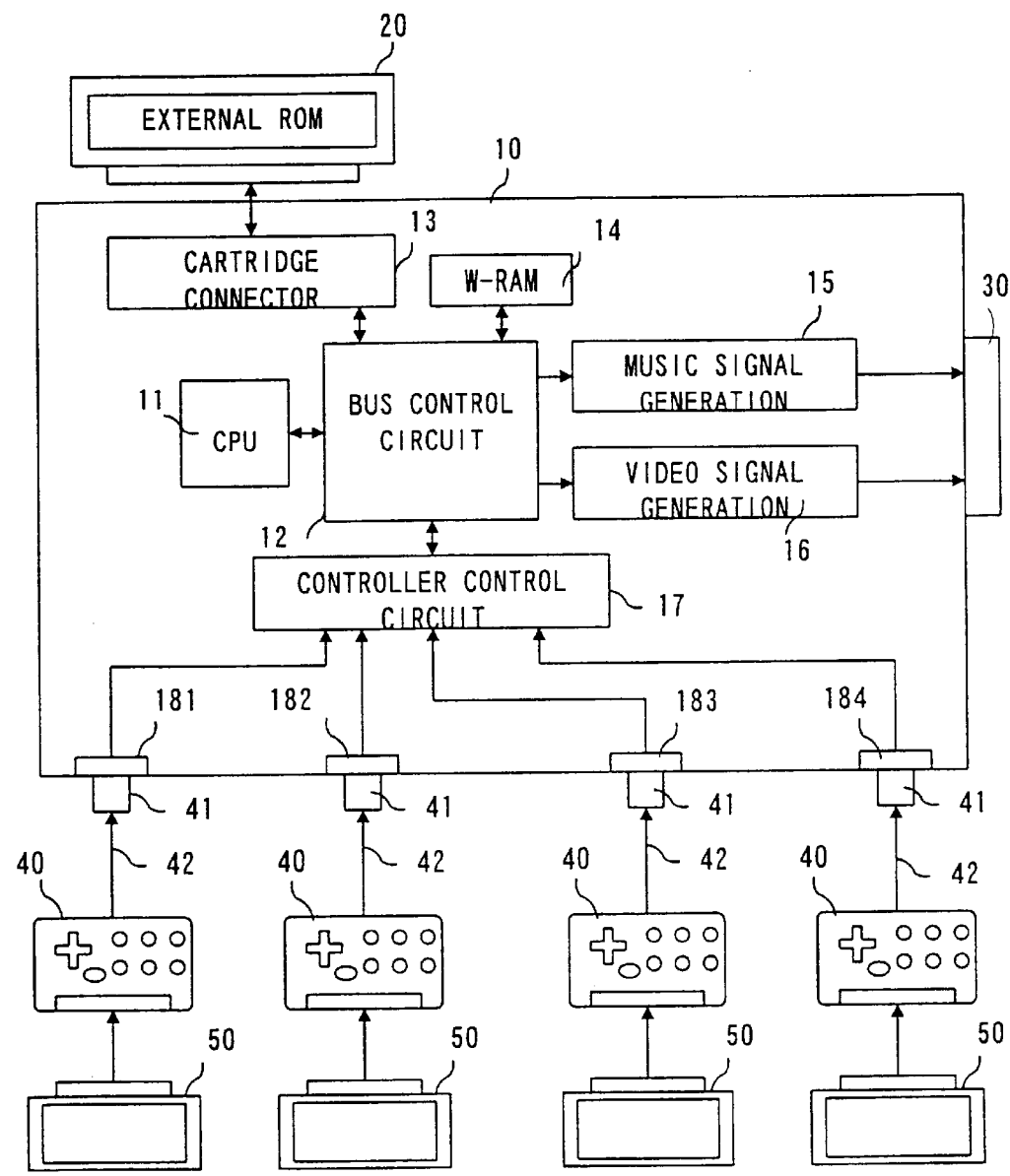
FIG. 2 is an exemplary block diagram of an image processing apparatus in the FIG. 1 embodiment.

FIG. 2 is a block diagram of the image processing system of this example. The image processing apparatus 10 incorporates therein a central processor unit (hereinafter "CPU") 11 and a bus control processing circuit 12. The bus control circuit 12 is connected to a cartridge connector 13 for detachably attaching the ROM cartridge 20, as well as a working RAM 14. The bus control processing circuit 12 is connect to an audio signal generating circuit 15 for outputting an audio signal process by the CPU 11 and a video signal generating circuit 16 for outputting a video signal, and further with a controller control circuit 17 for serially transferring operating data of one or a plurality of controller (s) 40 and/or data from RAM cartridge(s) 50. The controller control circuit 17 is connected with controller connectors (hereinafter abbreviated as "connectors") 181–184 which are provided at a front face of the image processing apparatus 10. To the connector 18 is detachably connected a connection jack 41 and the controller 40 through a cable 42. Thus, the connection of the controller to the connector 181–184 places the controller 40 into electric connection to the image processing apparatus 10, enabling transmission and reception of data therebetween.

More specifically, the bus control processing circuit 12 inputs commands output as parallel signals from CPU 11 via a bus, performs parallel to serial conversion, outputs command as serial signals to the controller control circuit 17, and converts serial signal data input from the controller control circuit 17 into parallel signals and outputs such signals to the bus. The data outputted through the bus is subject to processing by CPU 11, or is stored in W-RAM 14. The W-RAM 14 is a memory temporarily storing data to be processed by CPU 11, wherein read-out and write-in of data is possible through the bus control circuit 12.

Figure 3:
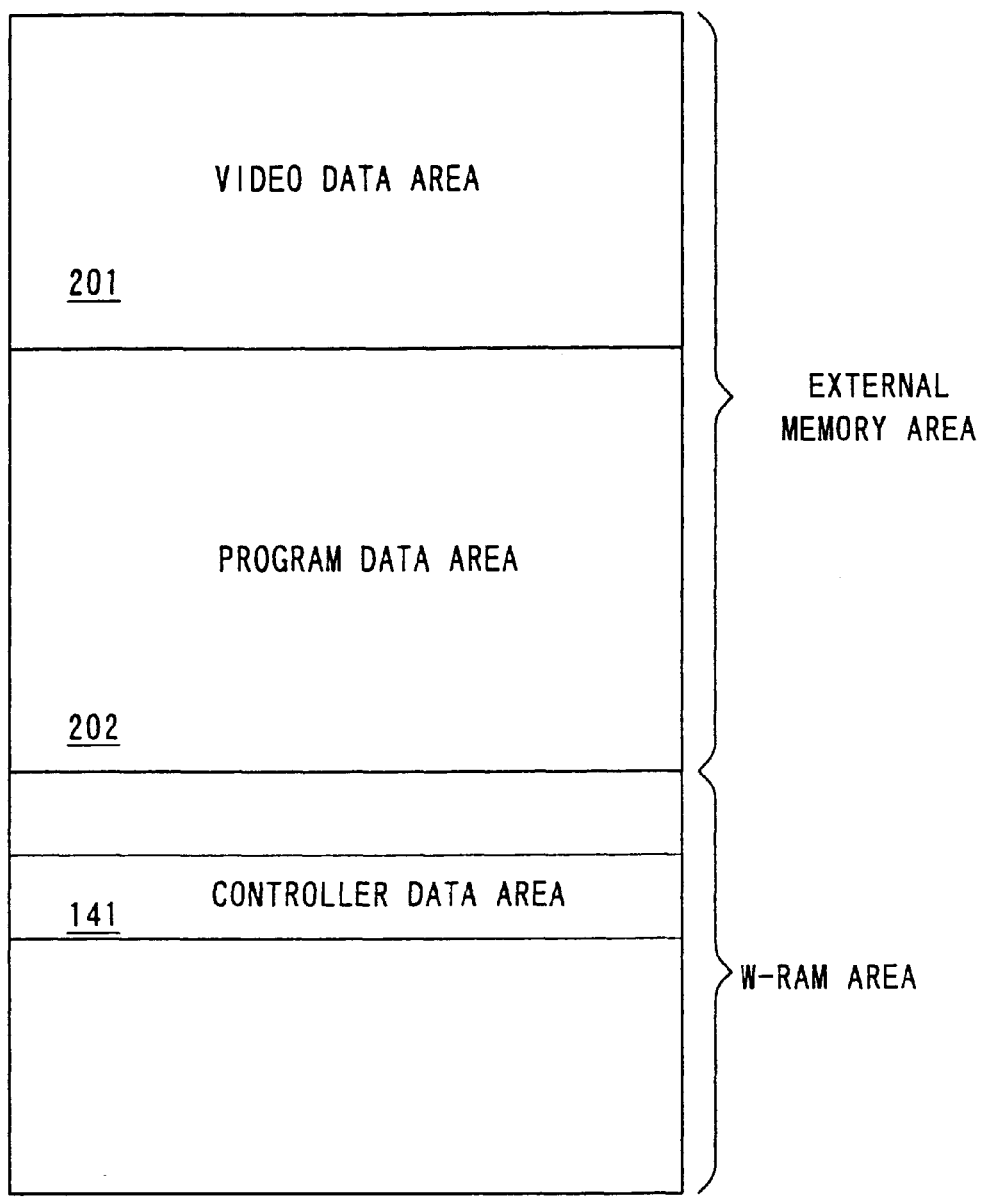
FIG. 3 is an illustrative view showing a CPU memory map for use in the FIG. 2 embodiment, showing an external memory and a W-RAM address space.

FIG. 3 is a diagrammatic illustration showing memory regions assigned to respective memory spaces. The memory spaces accessible by the CPU via the bus control processing circuit 12 involves an external memory address space of the ROM cartridge 20 and a memory address space of the W-RAM 14. The ROM cartridge 20 is structured by mounting on a board a ROM stored with data for game processing and accommodating the same board in a housing. The ROM includes an image data storage region 201 for storing image data required to cause the image processing apparatus 10 to generate image signals for the game, and a program data region 202 for storing program data required for predetermined operation of the CPU 11. In the program data region 202, there are stored an image display program for performing image display processing based on image data 201, a time-measuring program for carrying out measurement of time, and a determination program for determining that the cartridge 20 and an extension or expansion device 50, are in a predetermined relationship. The details of the time-measuring program and the determination programs are described below. The memory region of W-RAM 14 includes a region 141 for temporarily storing data representative of an operating state from a control panel.

Figure 4:
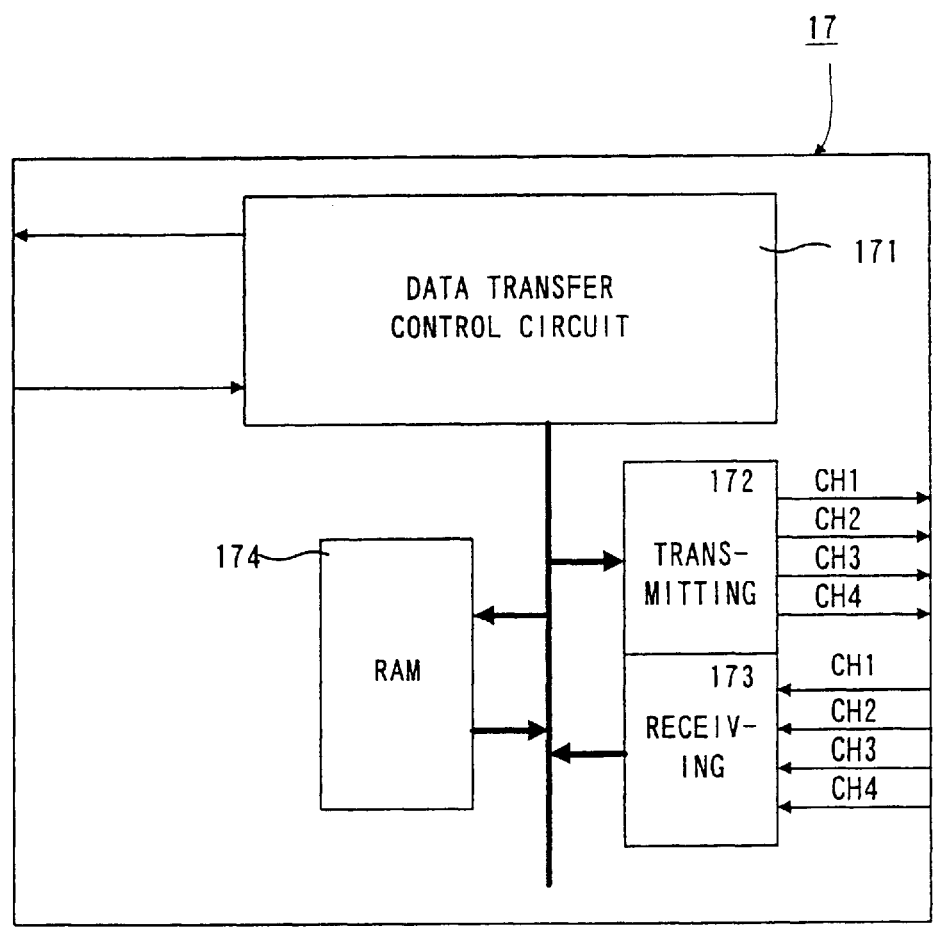
FIG. 4 is a block diagram showing an exemplary controller control circuit in the FIG. 2 embodiment.

FIG. 4 is a more detailed circuit diagram of a controller control circuit 17. The controller control circuit 17 transmits and receives data in serial form to and from the bus control processing circuit 12 and the controller connectors 181–184, and includes a data transfer control circuit 171, a signal transmitting circuit 172, a signal receiving circuit 173 and a RAM 174 for temporarily storing transmission and reception data. The data transfer control circuit 171 includes a parallel-serial conversion circuit and a serial-parallel conversion circuit for conversion of data format during data transfer, and also performs control of write-in and read-out of the RAM 174. The above-mentioned serial-parallel conversion circuit converts serial data supplied from the bus control processing circuit 12 into parallel data to provide such data to the RAM 174 or the signal transmitting circuit 172. The parallel-serial conversion circuit converts parallel data supplied from the RAM 174 or the signal receiving circuit 173 into serial data to provide such data to the bus control processing circuit 12. The signal transmission circuit 172 converts parallel data for signal read-in control of the controller 40 supplied from the data transfer control circuit 171 and write-in data (parallel data) to the RAM cartridge 50 into serial data, which serial data is transmitted through a corresponding channel CH1–CH4 to each of the plurality of controllers 40. The signal receiving circuit 173 receives serial read-out data, representative of an operating state of each of the controller 40, input through a corresponding channel CH1–CH4 to each of the controller 40 as well as read-out data from the RAM cartridge 50, to convert such data into parallel data to provide it to the data transfer control circuit 171.

Figure 5:
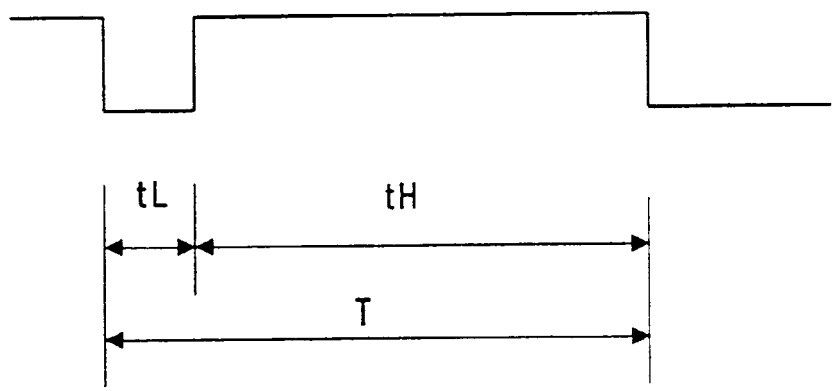
FIG. 5 is an illustrative view for explaining a modulating/demodulating method.
Figure 5:
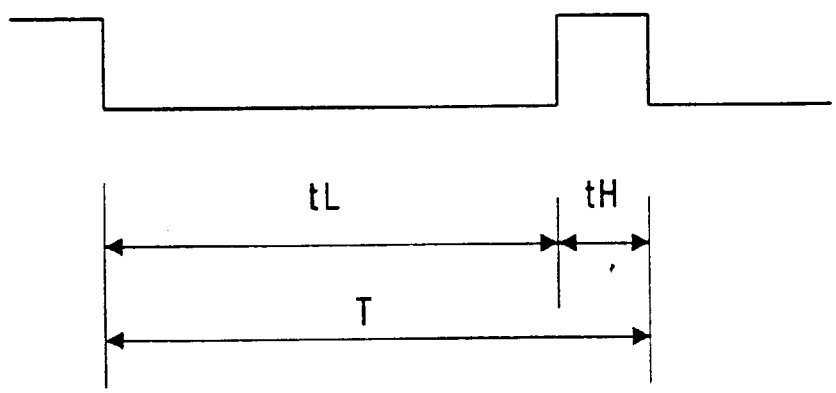

The signal transmitting circuit 172 and the signal receiving circuit 173 adopt a duty-cycle modulation and demodulation (hereinafter referred to as "modulation/demodulation") method as one example of the modulation/ demodulation method that may be employed here. The duty-cycle modulation/demodulation method, as shown in FIG. 5, is a modulation/demodulation method wherein "1" and "0" are represented by varying a Hi time period and a Lo time period for a signal at a certain interval. Explaining the modulation/demodulation method in more detail, when data to be transmitted in serial is a logical "1", a signal having, within one cycle period T, a high-level period tH rendered longer than a low-level period tL (tH>tL) is transmitted, while when data to be transmitted is a logical "0", a signal having, within one cycle period T, tH rendered shorter than tL (tH<tL) is transmitted.

The demodulation method samples on a serial signal received (bit transmission signal) so as to monitor at all times whether the received signal is at a high level or a low level, wherein one cycle is expressed as T=tL+tH provided that time period of low till change to high is tL and time period of high till change to low is tH. In this case, the relationship of tL and tH being tL<tH is recognized as logical "1", while tL>tH is recognized as logical "0", thereby achieving demodulation. If a duty-cycle modulation/demodulation method like this is employed, there is no necessity of transmitting data in synchronism with a clock signal, offering an advantage that transmission and reception of data are available with only one signal line. If two signal lines are available, another modulation/demodulation method may be utilized.

Figure 6:
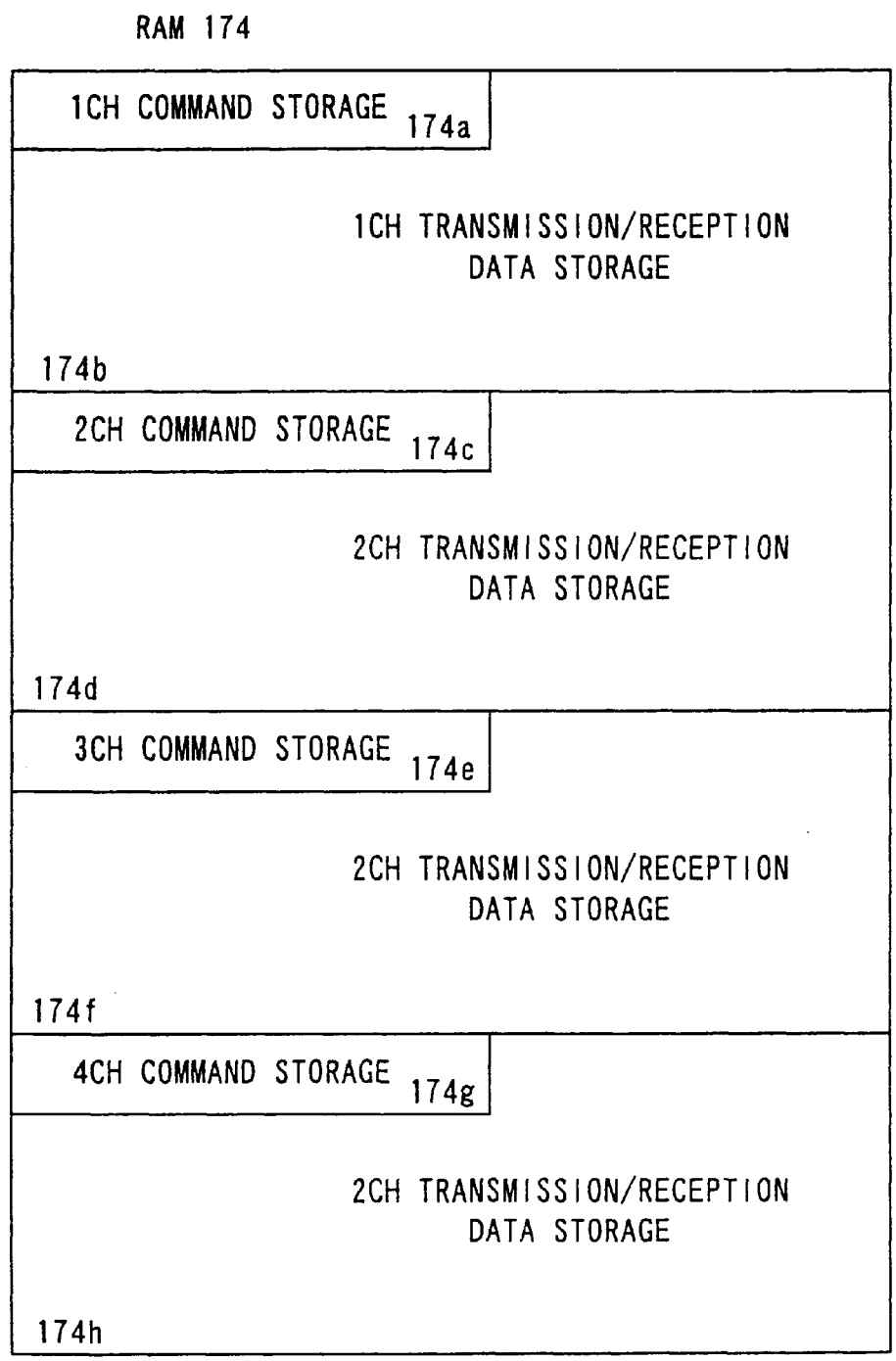
FIG. 6 is an illustrative view showing a memory map of a RAM in FIG. 4.

The RAM 174 includes memory regions or memory areas 174a–174H as shown in a memory map of FIG. 6. Specifically, the area 174a stores a command for channel 1, while the area 174b stores transmission data and reception data for channel 1. The 174c stores a command for channel 2, while the area 174d stores transmission data and reception data for channel 2. The area 174e stores a command for channel 3, while the area 174f stores transmission data and reception data for channel 3. The area 174g stores a command for channel 4, while the area 174h stores transmission data and reception data for channel 4.

Accordingly, the data transfer control circuit 171 operates to write-in control to the RAM 174 data transferred from the bus control processing circuit 12 or operating state data of the controller 40 received by the signal receiving circuit 173 or read-out data from the RAM cartridge 50, and read data out of the RAM 174 based on a command from the bus control processing circuit 12 to transfer it to the bus control circuit 12.

FIG. 7 and FIG. 8 are external views of the top and rear surfaces of the presently preferred controller 40. The controller 40 is in a shape that can be grasped by both hands or one hand, and has a housing having an exterior formed projecting with a plurality of buttons, which when depressed, are operable to generate an electrical signal and a vertically-standing control portion. Specifically, the controller 40 is constituted by an upper housing and a lower housing. As shown in FIG. 7, the controller 40 housing has an operating area formed on an upper surface in a planar shape running from switch 403 through buttons 404. In the operating area of the controller 40, there are provided a cross-shaped digital direction switch (hereinafter referred to as "cross switch") 403 on a left side, a plurality of button switches (hereinafter merely abbreviated as "switches") 404A–404F on a right side, a start switch 405 generally at a laterally central portion, and a joystick 45 for allowing analog input at a centrally lower portion. The cross switch 403 is a direction switch for designating the direction of movement of a player controlled heroic character or a cursor, which has upper, lower, left and right depression points to be used for designating movement in four directions. The switches 404A–404F, being different by game software, are used, for example, to launch a missile in a shooting game, or to designate various actions such as jumping, kicking, or taking a matter in an action game. Although the joystick 45 is used in place of the cross switch 403 to designate the direction of movement of a player controlled heroic character or the like, it can designate direction at the entire angular range over 360 degrees, being utilized as an analog direction designating switch.

The controller 40 housing has three grips 402L, 402C and 402R formed in a manner projecting downward from three locations of the operating area. The grips 402L, 402C and 402R are in such rod-shapes that, when seized by the hand, they are contoured by the palm, the middle finger, the finger between the middle and little fingers and the little finger. Each grip is formed a little thin at a base portion, thick at an intermediate portion and thinner toward an open end (downward in FIG. 7). The lower housing of the controller 40 has an insertion aperture 409 formed at a centrally upper portion which projects from the underside for detachably attaching a RAM cartridge 50 as an expansion device. The housing has a button switch 406L and a button 406R provided left and right on upper side faces thereof at locations corresponding to the positions to which the left and right index fingers of a player extend. In a back surface at the base portion of the central grip 402C, a switch 407 is provided as a switch having a function alternative to the switch 406L when the joystick 45 is used in place of the cross switch 403.

The lower half of the housing on a back surface side extends toward a bottom surface to have an aperture 408 formed at a tip end thereof. At a deep end of the aperture 408, a connector (not shown) to which an extension cartridge 50 is to be connected is provided. In the aperture 408 is also formed a lever 409 for ejecting the cartridge 50 inserted in the aperture 408. On a side opposite to the lever 409 in the aperture 408 for insertion of an extension cartridge 50, a cut-out 410 is formed, which cut-out 410 provides a space for pulling out the extension cartridge 50 upon taking out the extension cartridge 50 by using the lever 409.

Figure 9:
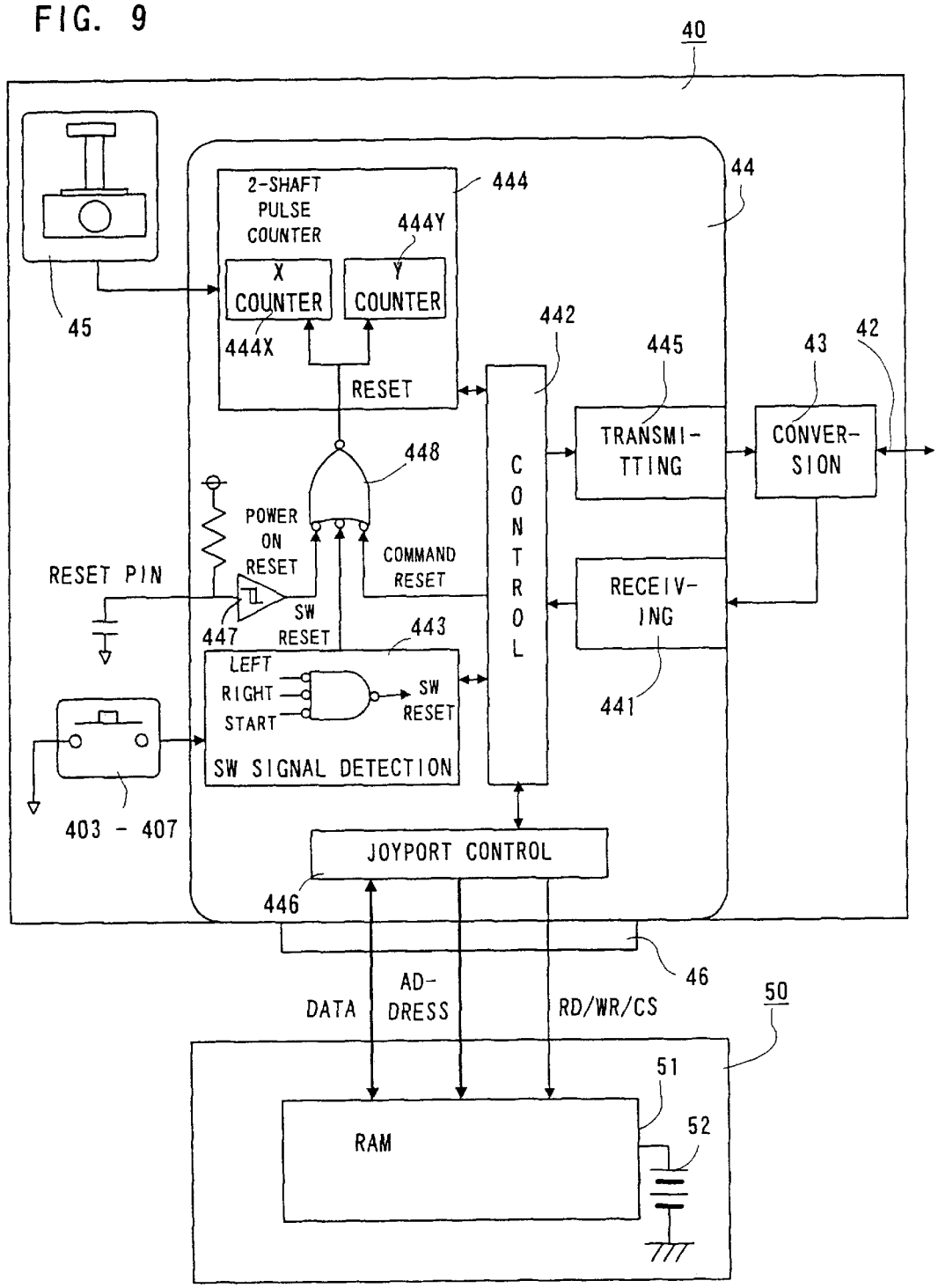
FIG. 9 is a block diagram showing in detail the controller and an expansion device.

FIG. 9 is a detailed circuit diagram of a controller 40 and a RAM cartridge 50 (as one example of an extension device). The controller 40 incorporates within its housing, electronic circuits such as an operation signal processing circuit 44, etc. in order to detect operating states of the switches 403–407 or the joystick 45 or the like and transfer detected data to the controller control circuit 17. The operation signal processing circuit 44 includes a signal receiving circuit 441, a control circuit 442, a switch signal detecting circuit 443, a counter circuit 444, a signal transmitting circuit 445, a joyport control circuit 446, a reset circuit 447 and a NOR gate 448.

The signal receiving circuit 441 converts a serial signal, such as a control signal transmitted from the controller control circuit 17, write-in data to the RAM cartridge 50, etc., into a parallel signal to supply it to the control circuit 442. The control circuit 442 generates a reset signal to cause resetting (e.g., setting to 0) on measured values of an X-axis counter 444X and a Y-axis counter 444Y included in the counter 444, when the control signal transmitted from the controller control circuit 17 is a reset signal for an X, Y coordinate of the joystick 45. The joystick 45 includes photo-interrupters for the X-axis and Y-axis so as to generate the number of pulses proportional to the amount of inclination of a lever in directions of X-axis and Y-axis, providing respective pulse signals to the counters 444X and 444Y. The counter 444X, when the joystick 45 is inclined in the X-axis direction, measures the number of pulses generated in proportion to the amount of inclination. The counter 444Y measures the number of pulses generated in proportion to the amount of inclination, when the joystick 45 is inclines in the Y-axis direction. Accordingly, the resultant vector, determined by the measured values in X-axis and Y-axis of the counter 444X and the 444Y, determines the direction of movement and the coordinate position for the heroic character or the cursor. The counter 444X and the counter 444Y are also reset of their measured values by a reset signal supplied from the reset signal generating circuit 447 upon turning on the power supply, or a reset signal supplied from the switch signal detecting circuit 443 when the player depresses simultaneously two switches previously determined.

The switch signal detecting circuit 443 responds to an output command signal representing a switch state supplied at a constant period (e.g., at a ⅟₃₀-second interval as a frame period of a television), and reads a signal that is varied by the state of depression of the cross switch 403 and the switches 404A–404F, 405, 406L, 406R and 407 to supply it to the control circuit 442.

The control circuit 442 responds to a read-out command signal of operating state data from the controller control circuit 17, and supplies the operating state data of the switches 403–407 and the measuring values of the counters 444X, 444Y to the signal transmitting circuit 445 in a predetermined data-format order. The signal transmitting circuit 445 converts these parallel signals output from the control circuit 442 into serial data to transfer them to the controller control circuit 17 via a conversion circuit 43 and a signal line 42.

The control circuit 442 is connected to an address bus, a data bus, and a port control circuit 446 through a port connector. The port control circuit 446 performs input-output control (or signal transmission or reception control) on data according to commands by the CPU 11, when the RAM cartridge 50 (as one example of an extension device) is connected to a port connector 46. The RAM cartridge 50 includes a RAM 51 and a timer chip 53 as one example of a time-related information generating means (or a calendar timer) connected to the address bus and the data bus, a battery 52 connected thereto for supplying power source to the RAM 51 and the timer counter 53, and a decoder 54 for activating the timer counter 53 when a predetermined address is given. The RAM 51 is a RAM that has a capacity lower than a half of a maximum memory capacity accessible by using an address bus, and is comprised for example of a 256 k-bit RAM. This is because of avoiding duplication between the write-in/read-out address of the RAM and the read-out address of the timer chip 53 by reading out a value of an arbitrary counter within the timer chip 53 when the highest order bit becomes "1". The RAM 51 stores backup data associated with a game, so that, if the RAM cartridge 50 is removed out of the port connector 46, the stored data is kept by receiving power supplied from the battery 52. The details of the kind of data stored by the RAM 51, writing data therein, and utilization of the data stored is described below.

FIG. 10 is a graphical illustration of a data format by which the image processing apparatus reads out data representative of an operating state of switches 403–407 and joystick 45 from the controller 40. The data generated by the controller 40 is configured as 4-byte data. The first-byte represents B, A, G, START, upper, lower, left and right, i.e. represents the depression of the switch 404B, 404A, 407, 405 and the four cross switch 403 directions. For example, when the button B, i.e., the switch 404B, is depressed, the highest order bit of the first byte becomes "1". Similarly, the second-byte represents JSRST, 0 (not employed in the embodiment), L, R, E, D, C, and F, i.e., the depression of the switch 409, 406L, 406R, 404E, 404D, 404C and 404F. The third byte represents by binary digit the X coordinate value (the value measured by the X counter 444X) which value is dependent upon the inclination angle of the joystick 45 in the X direction. The fourth byte represents by binary digit the Y coordinate value (the value measured by the Y counter 444Y) which value is dependent upon the inclination angle of the joystick 45 in the Y direction. Because the X and Y coordinate values are expressed by 8 bits of binary digits, the conversion into decimal digits makes it possible to represent the inclination of the joystick 45 by a numeral from 0–255. If the highest order bit is expressed by a signature denoting a negative value, the inclination angle of the joystick 45 can be expressed by a numeral between—128 and 127.

Referring to FIG. 11 to FIG. 14, an explanation will be made on a format for the signals transmitted and received between the image processing apparatus 10 and the controller 40.

Figure 11:
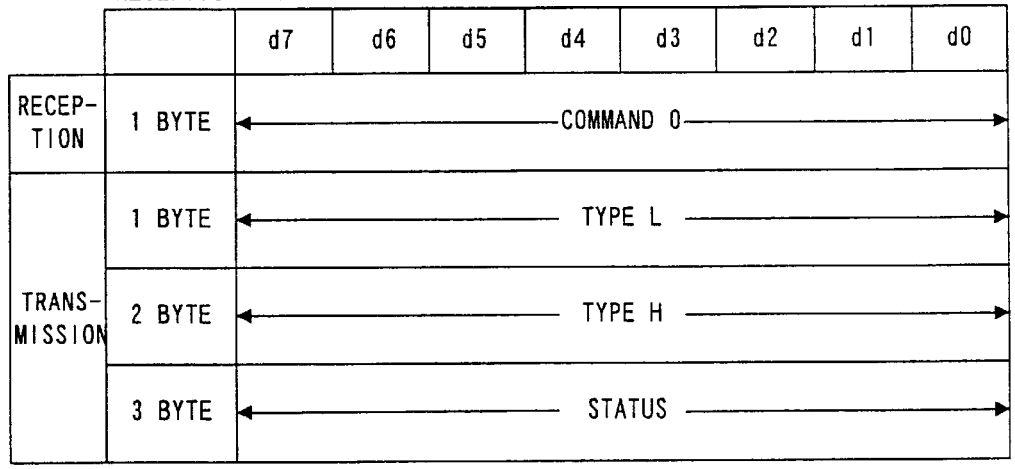
FIG. 11 shows illustrative transmission and reception data when a command "0" is transmitted from the controller control circuit.

FIG. 11 is an illustrative representation of a format for the signals transmitted and received between the image processing apparatus 10 and the controller 40 for identification of the type of a controller 40 by the image processing apparatus 10. The image processing apparatus 10 transmits a type data request signal of a command "0" configured by 1 byte (8 bits) to the control circuit 442 within the controller 40, and receives in response thereto, 3 bytes of a type data signal, concerning the controller 40, of TYPE L (1 byte), TYPE H (1 byte) and the status generated by the control circuit 442. Here, TYPE L and TYPE H are data representative of a function of a device or apparatus connected to connector 46. The respective data of TYPE L and TYPE H are data inherent to the type of a RAM cartridge 50. Based on the data, the image processing apparatus 10 identifies the type of a controller 40, i.e., the type of a RAM cartridge 50 being connected to the controller 40. The type of RAM cartridge 50 involves for example a type merely mounted with a RAM 51, a type mounted with a RAM 51 together with a timer chip, and a type mounted with a RAM 51 together with a liquid crystal display. In the present embodiment, the type mounted with a RAM 51 and a time chip is explained in detail. Meanwhile, the status data is data that represents whether or not the port is connected to an extension device such as a RAM cartridge 50 and whether or not an extension device has been connected thereto after resetting.

Figure 12:
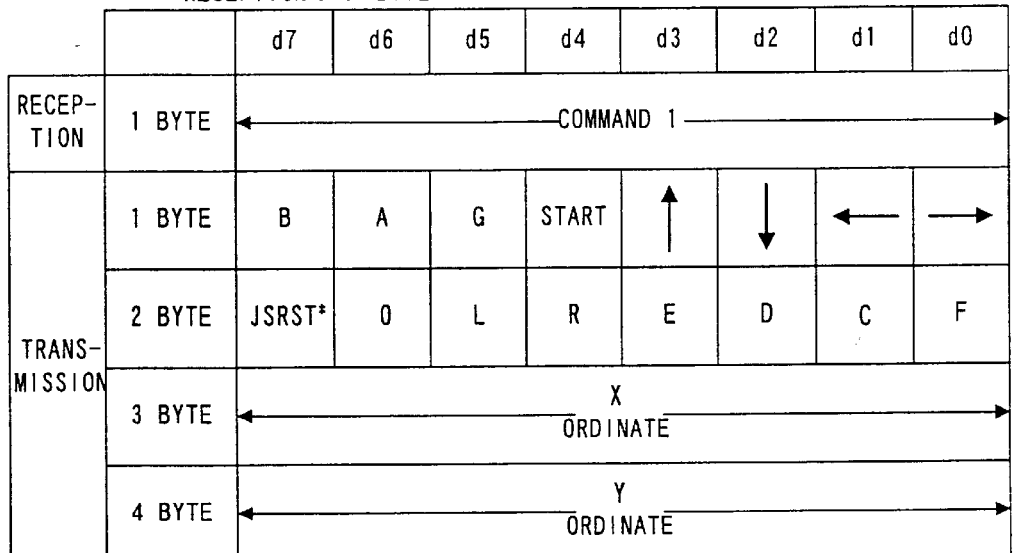
FIG. 12 shows illustrative transmission and reception data when a command "1" is transmitted from the controller control circuit.

FIG. 12 is an illustrative representation of a format for the signal transmitted and received between the image processing apparatus 10 and the controller 40 for determining the operating state of the controller 40 by the image processing apparatus 10. The image processing apparatus 10 transmits a controller data request signal of a command "1" configured by 1 byte (8 bits) to the control circuit 442 within the controller 40, and receives in response thereto an operating state data signal, concerning the controller 40, generated by the control circuit 442. Based on the operating state data, the image processing apparatus 10 acknowledges how the operator operates the controller 40 for utilization for varying the image. The operating state data signal has been described in detail in the explanation on FIG. 10.

Figure 13:
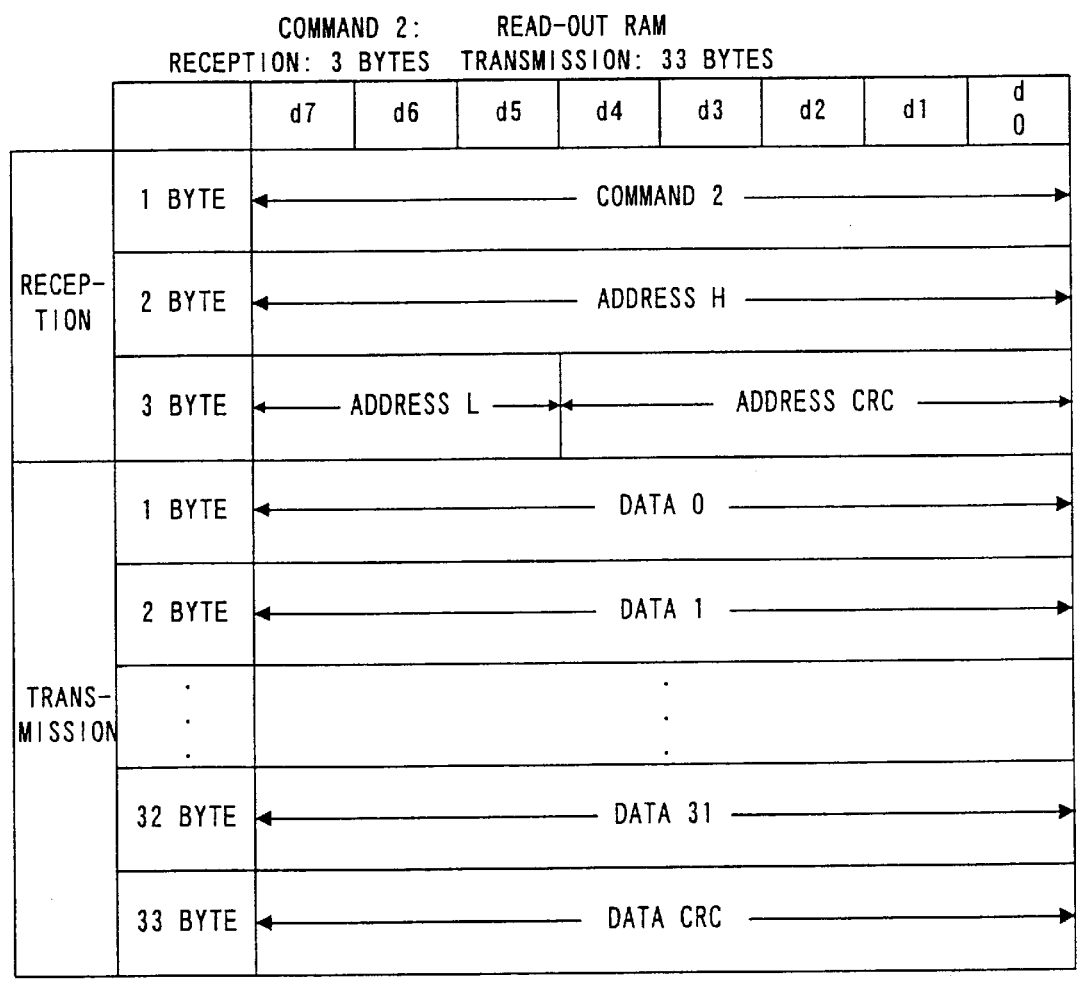
FIG. 13 shows illustrative view of transmission and reception data when a command "2" is transmitted from the controller control circuit.

FIG. 13 is an illustrative representation of a format for a read data signal when the image processing apparatus 10 reads data from the RAM 51 within the RAM cartridge 50 which is connected to controller 40. The image processing apparatus 10 transmits to control circuit 442, a read command signal of a command "2" configured by 1 byte (8 bits), an address H (8 bits) signal representative of the higher order bits of an address, an address L (8 bits) signal representative of the lower order bits of an address and an address CRC (5 bits) signal for checking for transmission errors of address data of the address H signal and address L signal. The image processing apparatus receives in response thereto a storage data signal, for the RAM 51, Generated by the control circuit 442 and a data CRC (8 bits) signal for checking for data transmission error. Incidentally, to read out time-related information of the timer chip 53 by the image processing apparatus 10, it is satisfactory to read out addresses of 8000 h or longer by merely rendering the address H signal value greater than 80 h.

Figure 14:
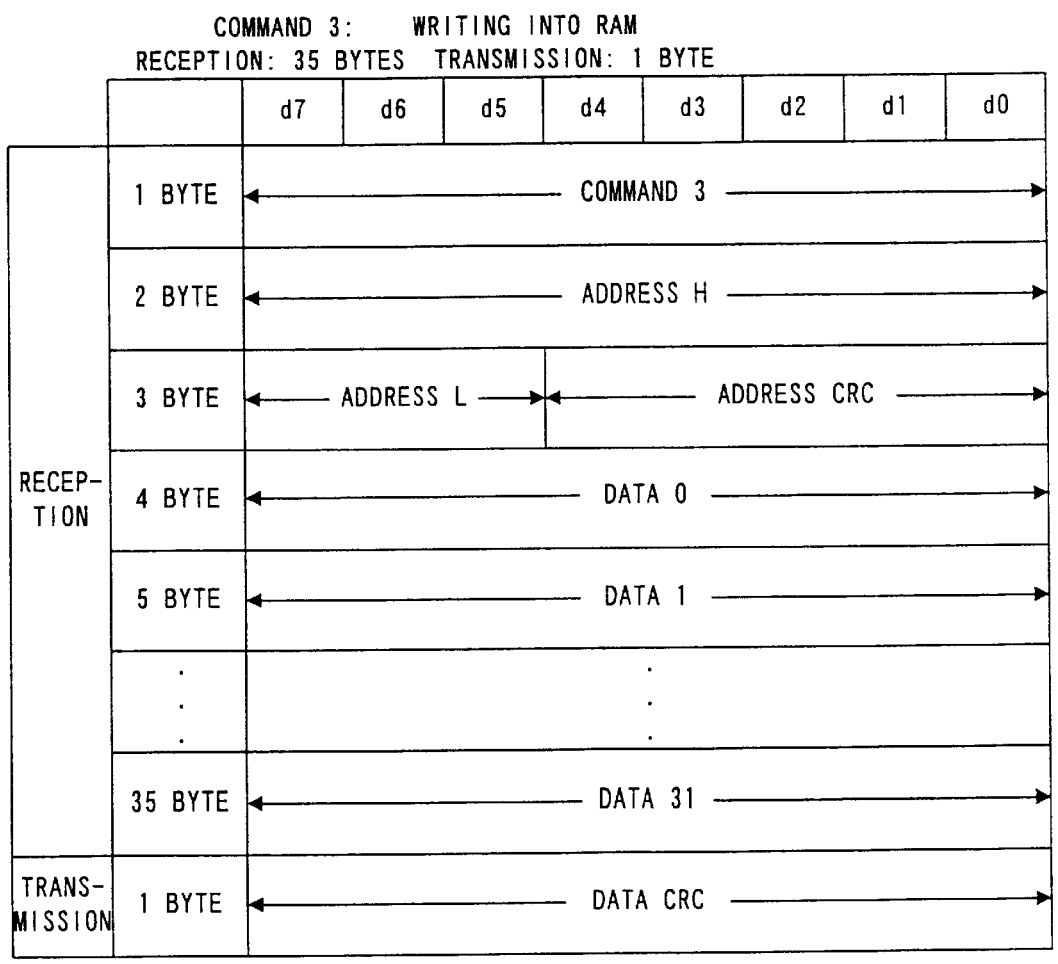
FIG. 14 shows illustrative view of transmission and reception data when a command "3" is transmitted from the controller control circuit.

FIG. 14 is an illustrative representation of a format for a write data signal when the image processing apparatus 10 writes data into the RAM 51 within the RAM cartridge 50 connected to controller 40. The image processing apparatus 10 transmits, to the control circuit 442, a write command signal of a command "3" configured by 1 byte (8 bits), an address H (8 bits) signal representative of a higher order bit of an address, an address L signal and an address H signal representative of a lower order bit (3 bits) of an address, an address CRC (5 bits) signal for checking for transmission error of address data of the address L signal, and a 32 -byte write-in data signal to be written into the RAM 51. The image processing apparatus 10 receives in response thereto a data CRC (8 bits) signal generated by the control circuit 442 for checking for data reception error. The image processing apparatus 10 receives the CRC signal to perform CRC checking with the transmitted write-in data, and judges based thereon that the data has correctly been written into the RAM 51. Incidentally, to reset for example date and time by writing time-related information into the timer chip from the image processing apparatus 10, it is satisfactory to perform writing into addresses of 8000 h or higher by merely rendering the address H signal value greater than 80 h.

The operation of data transmission and reception between the image processing apparatus 10 and the controller 40 will now be explained.

Figure 15:
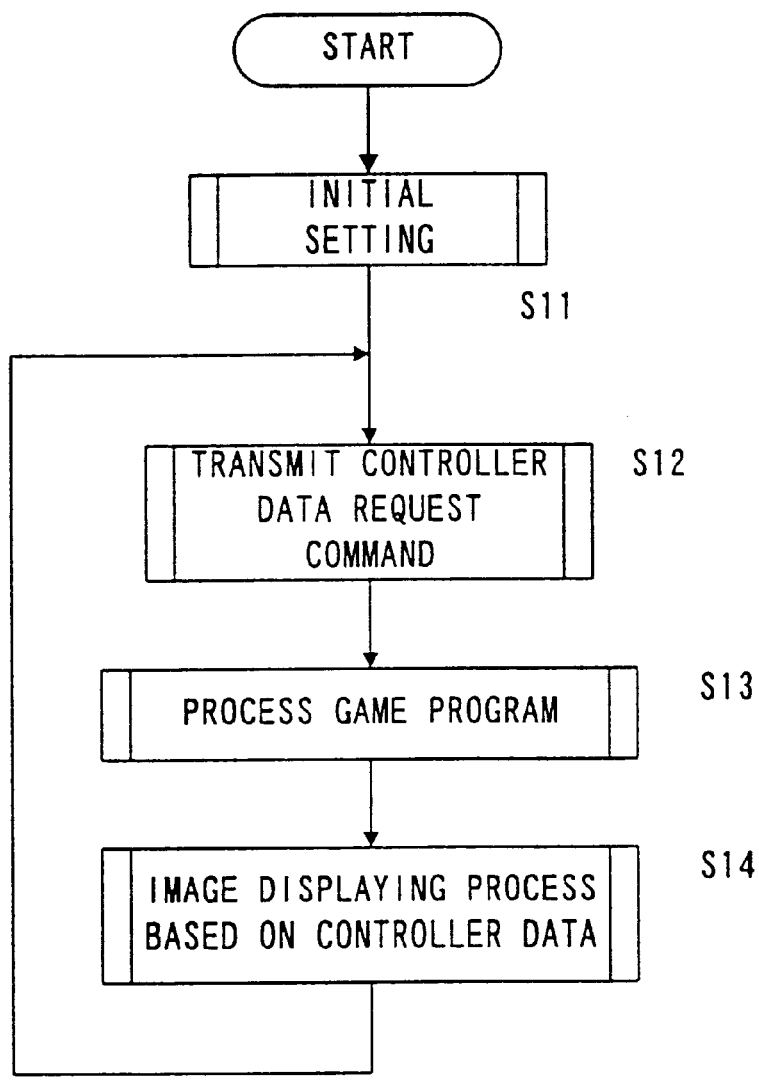
FIG. 15 is a flowchart showing operation of the CPU of the FIG. 2 embodiment.

Referring first to a flowchart for the CPU of the image processing apparatus 10 in FIG. 15, explanations will be made on image processing. At a step S11, CPU 11 is initialized based on an initial value (not shown) stored in the program data area 202 in FIG. 3. Then, at a step S12, the CPU 11 outputs a control pad data request command stored in the program data area 202 to the bus control circuit 12. At a step S13, the CPU 11 carries the desired image processing based on the program stored in the program data area 202 and the image data area 201. While the CPU 11 is executing step S13, the bus control processing circuit 12 is executing steps S21–S24 of FIG. 16. Then, at a step S14, the CPU 11 outputs image data based on the control pad data stored in the control pad data area 141 in FIG. 3. After completing step S14, the CPU branches to steps S12 and repeats the execution of steps S12–S14.

Figure 16:
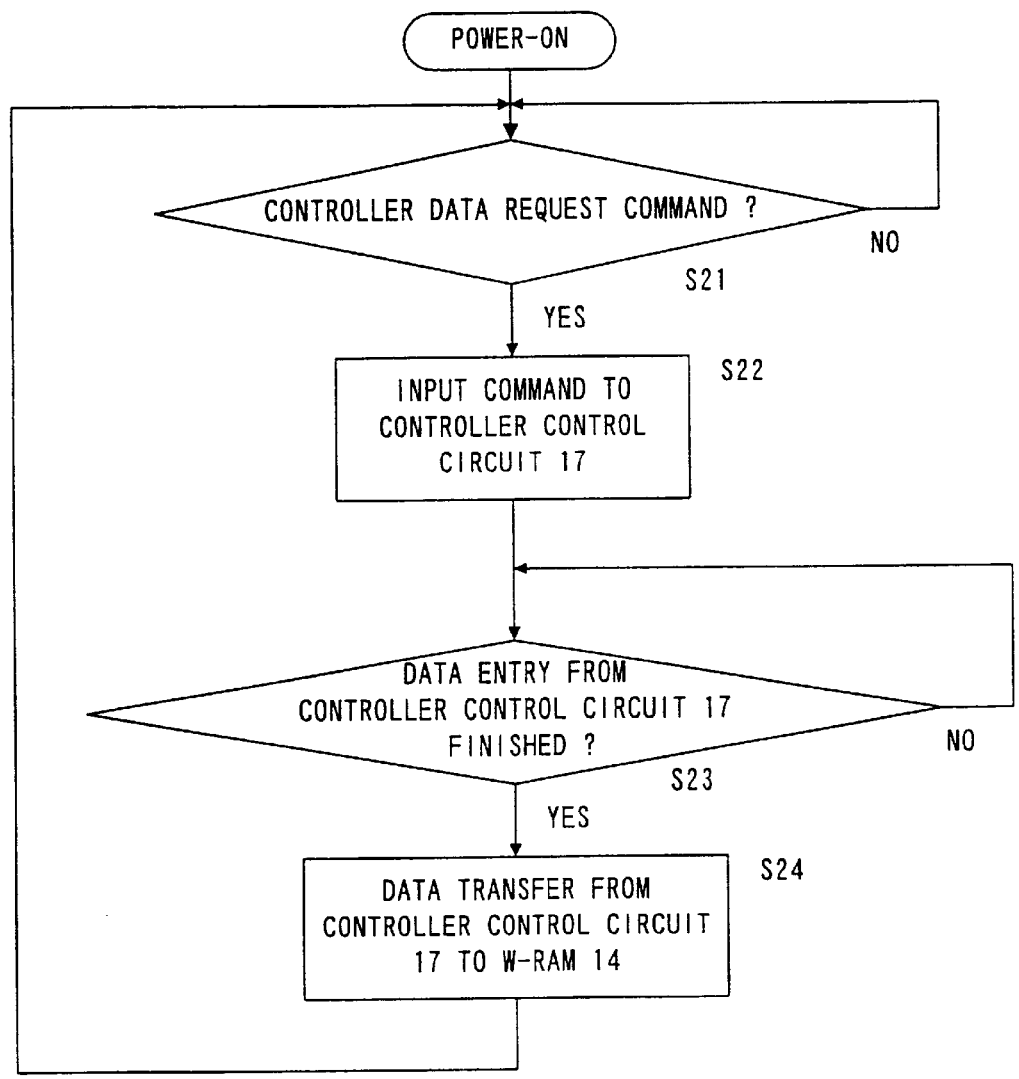
FIG. 16 is a flowchart showing operation of the bus control circuit of the FIG. 2 embodiment.

The operation of the bus control processing circuit 12 is explained in conjunction with FIG. 16. At a step S21, the bus control circuit 12 determines whether or not the CPU 11 has output a controller data request command (a request command for data relating to the switches of the controller 40 or data on the extension device 50). If a controller data request command has been output, the process proceeds to a step S22. At the step S22, the bus control circuit 12 outputs a command for reading in data of the controller 40 (command 1 or command 2 referred above) to the controller control circuit 17. Then, at a step S23, the bus control circuit 12 determines whether or not the controller control circuit 17 has received data from the controller 40 to store in the RAM 174. If the controller control circuit 17 has not received data from the controller 40 to store in the RAM 174, the bus control circuit 17 waits at step S23. If the controller control circuit 17 has received data from the controller 40 to store in the RAM 174, the process proceeds to a step S24. At step S24, the bus control circuit 12 transfers the data of the controller 40 stored in the RAM 174 to the W-RAM 14. The bus control circuit 12, when completing the data transfer to the W-RAM 14, returns the process back to the step S21 to repeat execution of the step S21—the step S24. The FIG. 15 and FIG. 16 flowcharts show the example wherein, after the bus control circuit 12 has transferred data from the RAM 174 to the W-RAM 14, the CPU 11 processes the data stored in the W-RAM 14. However, the CPU 11 may directly process the data in the RAM 174 through the bus control circuit 12.

Figure 17:
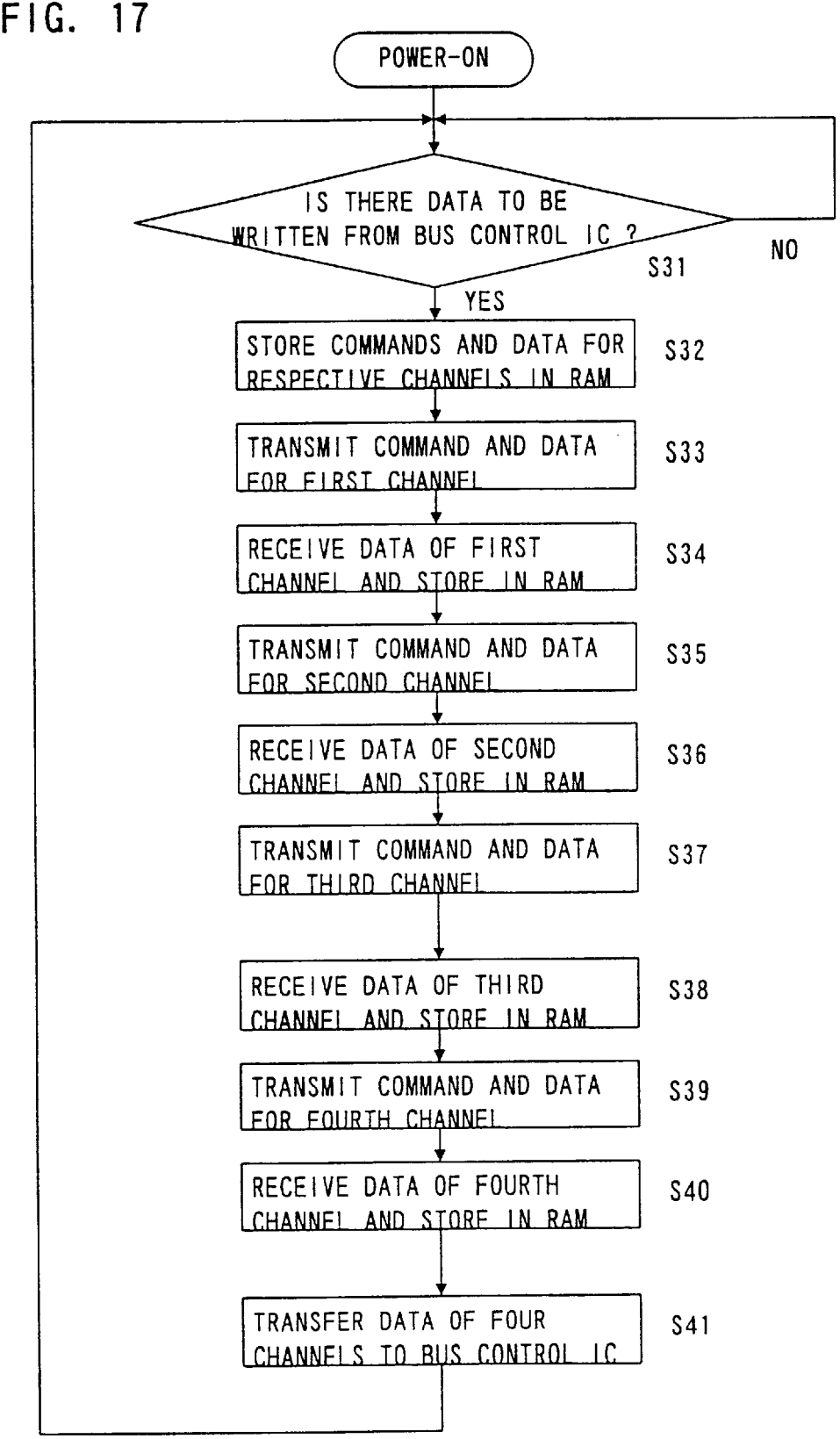
FIG. 17 is a flowchart showing operation of the controller control circuit of the FIG. 2 embodiment.

FIG. 17 is a flowchart for explaining the operation of the controller control circuit 17. At a step S31, it is determined whether there is data to be written from the bus control circuit 12. If there is not, the data transfer control circuit 171 waits until there is data to write-in from the bus control circuit 12. If there is data to be written, at a next step S32 the data transfer control circuit 171 causes the RAM 174 to store commands for the first to the fourth channels and/or data (hereinafter abbreviated as "command/data"). At a step S33, the command/data for the first channel is transmitted to the controller 40 being connected to the connector 181. The control circuit 442 performs a predetermined operation based on the command/data to output data to be transmitted to the image processing apparatus 10. The content of the data will be described below in explaining the operation of the control circuit 442. At a step S34, the data transfer control circuit 171 receives data output from the control circuit 442, to cause the RAM to store the data.

At a step S35 the command/data for the second channel is transmitted to the controller 40, in a manner similar to the operation for the first channel at the steps S33 and S34. The control circuit 442 performs a predetermined operation based on this command/data to output the data to be transmitted to the image processing apparatus 10. At a step S36 data transfer and write-in processes are carried out for the second channel. Meanwhile, at a step S37, the command/data for the fourth channel is transmitted to the controller 40. The control circuit 442 performs a predetermined operation based on this command/data to output the data to be transmitted to the image processing apparatus 10. At a step S38 data transfer and write-in processes are carried out for the third channel. Furthermore, at a step S39, the command/data for the fourth channel is transmitted to the controller 40. The control circuit 442 of the controller 40 performs a predetermined operation based on this command/data to output the data to be transmitted to the image processing apparatus 10. At a step S40 data transfer and write-in processes are carried out for the fourth channel. At a subsequent step S41, the data transfer circuit 171 transfer in batch the data which have received at the steps S34, S36, S38 and S40 to the bus control circuit 12.

In the above identified manner, the data for the first channel to the fourth channel, that is, the commands for the controllers 40 connected to the connectors 181–184 and the operating state data to be read out of the controllers 40, are transferred by time-divisional processing between the data transfer control circuit 171 and the control circuit 442 respectively within the controllers 40.

Figure 18:
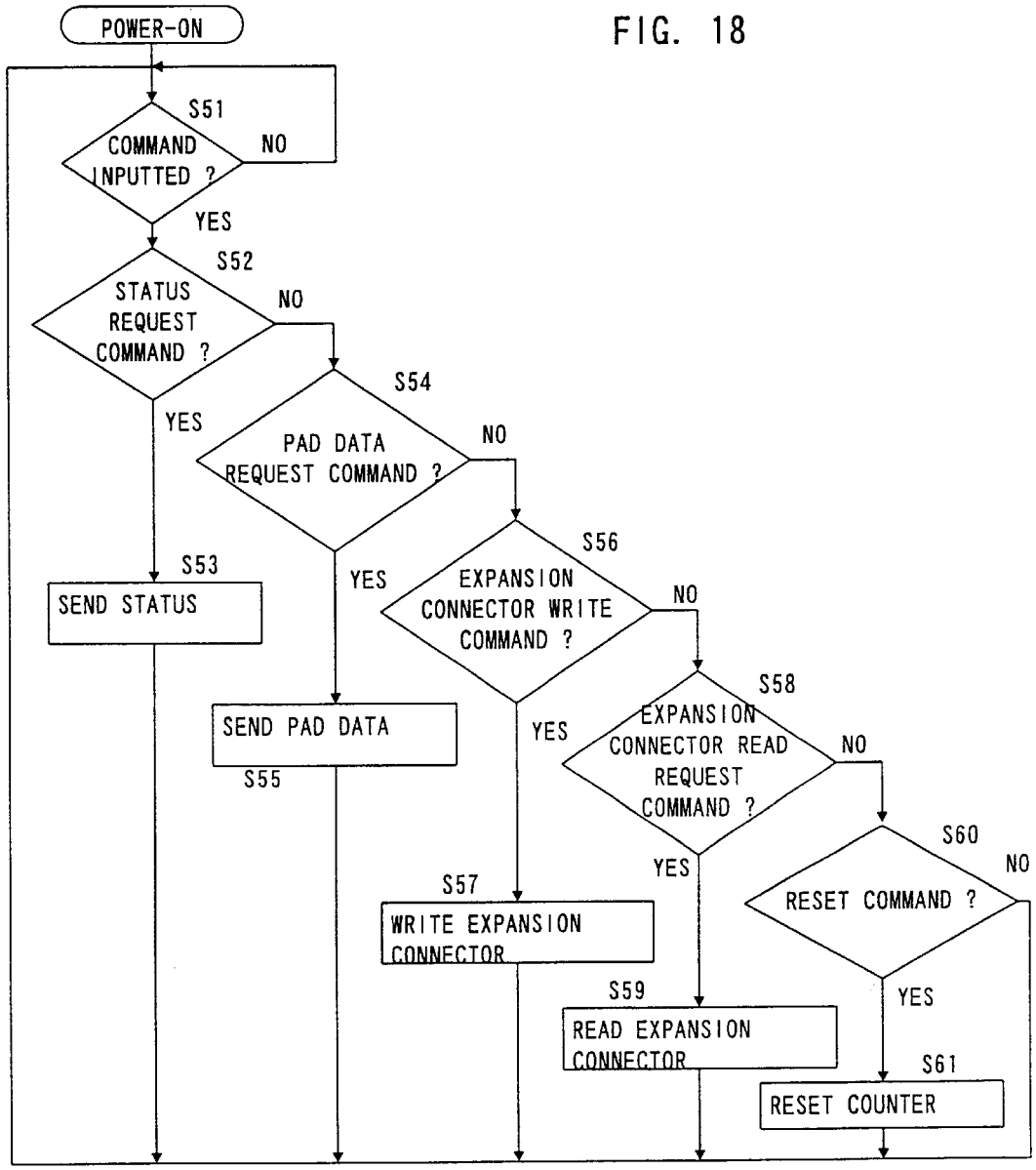
FIG. 18 is a flowchart showing operation of the controller circuit of the FIG. 2 embodiment.

FIG. 18 is a flowchart explaining the operation of the controller circuit 44. First, at a step S51, it is determined whether or not a command has been input from the image processing circuit 10 to the control circuit 442. If no command has been inputted, the controller circuit waits for a command. If a command is input, at a step S52 it is determined whether or not the command inputted to the control circuit 442 is a status request command (command "0"). If a command "0" is detected, the process proceeds to a step S53, wherein a status transmitting process is carried out.

At the step S53, where the CPU 11 outputs the command "0", the data in the format as shown in FIG. 13 is transmitted and received between the image processing apparatus 10 and the controller 40. On this occasion, the control circuit 442, when receiving the command "0" data configured by 1 byte (8 bits), transmits TYPE L (1 byte), TYPE H (1 byte) and the status. Here, TYPE L and TYPE H are data for identifying the function of a device or apparatus being connected to the joyport connector 46, which are inherently recorded in the RAM cartridge 50. This makes possible recognition by the image processing apparatus 10 as to what extension device (e.g., a RAM cartridge 50 or other extension devices such as a liquid crystal display) is connected to the controller 40. The status is data representative of whether or not an extension device such as a RAM cartridge 50 is connected to the port and whether or not the connection of the extension device is after resetting.

On the other hand, at the step S52 if the determination reveals that there is not a command "0", it is determined at a step S54 whether or not the inputted command is a pad-data request command (command "1"). If it is a command "1", the process proceeds to a step S55 where the process of transmitting pad data is performed. Specifically, where the CPU 11 outputs a command "1", the data in format as shown in FIG. 14 is transmitted and received between the image processing apparatus 10 and the controller 40. On this occasion, the control circuit 442, if receiving command "1" data configured by 1 byte (8 bits), transmits the data of 14 switches (16 bits) of B, A, G, START, upper, lower, left, right, L, R, E, D, C and F; the data of JSRST (1 bit); and the data of the counter 444X and the counter 444Y (16 bits). By transmitting these data to the image processing apparatus 10, the image processing apparatus 10 recognizes how the operator operated the controller 40. Thus, these data are utilized for modifying the image by the image processing apparatus 10 in accordance with the operating state of the controller 40 as manipulated by the player.

At the aforesaid step S54, if the determination reveals that there is not a command "1", it is determined at step S56 whether or not the input command is a read-out request command (command "2") for data associated with the RAM cartridge 50 to be connected to the extension connector. If it is a command "2", the process proceeds to a step S57 where the process reading out of the extension connector is performed. Specifically, where the CPU 11 outputs a command "2", the data in format as shown in FIG. 13 is transmitted and received between the image processing apparatus 10 and the controller 40. On this occasion, when the control circuit 442 receives command "2" data configured by 1 byte (8 bits), address H representative of the higher-order bits (8 bits) of address, address L representative of the lower-order bits (3 bits) of address, and address CRC (5 bits) for checking for error in address data transmitted and received, the control circuit 442 transmits data stored in the RAM cartridge (32 bytes) and CRC (8 bits) for checking for data errors. In this manner, the connection of the RAM cartridge 50 (or other extension devices) and the image processing apparatus 10 enables the image processing apparatus 10 to process data from the RAM cartridge 50, etc.

At the aforesaid step S56, if the determination is not a command "2", it is determined at a subsequent step S58 whether or not the inputted command is a write-in request command (command "3") for information associated with the RAM cartridge 50 being connected to the extension connector 46. Where it is the command "3", the process of data read-out is carried out at a step 59 for the RAM cartridge 50 being connected to the extension connector 46. Specifically, if the CPU 11 outputs a command "3", the data shown in FIG. 14 is transmitted and received, in response to the command "3", between the image processing apparatus 10 and the controller 40.

That is, when the control circuit 442 receives command "3" data configured by 1 byte (8 bits), address H representative of the higher-order bits of address (8 bits), address L representative of the lower-order bits of address (3 bits), address CRC for checking for error in address data transmitted and received (5 bits), and data to be transmitted to the RAM cartridge 50 (32 bytes), it transmits CRC for checking for error for data received (8 bits). In this manner, the connection of the extension device 50 and the image processing apparatus 10 enables the image processing apparatus 10 to control the extension device 50. The connection of the extension device 50 and the image processing apparatus 10 also drastically improves the function of the controller 40.

Figure 19:
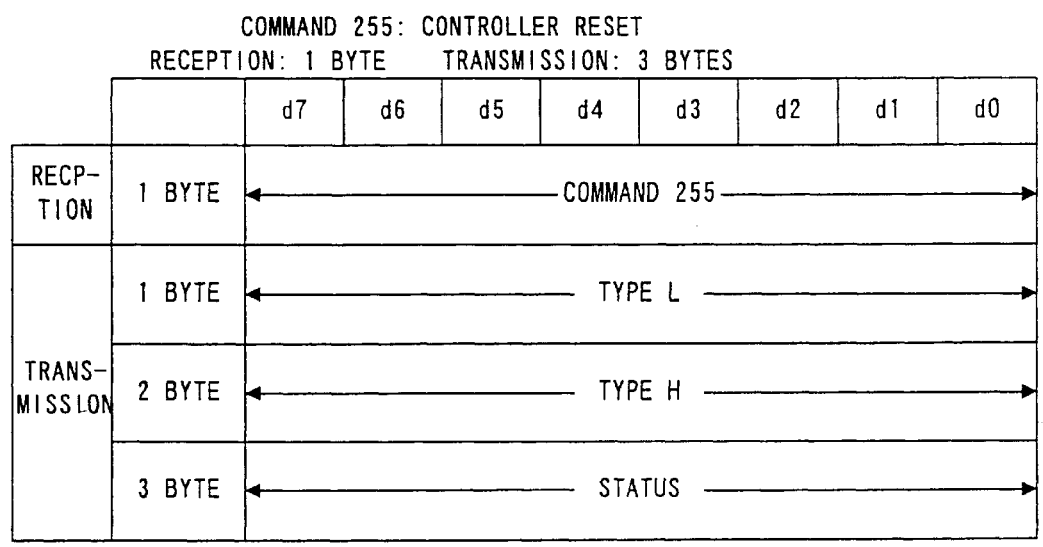
FIG. 19 shows illustrative transmission and reception data when a command "255" is transmitted from the controller control circuit.

If at the aforesaid step S58 the determination is not a command "3", it is determined at a step 60 whether or not it is a reset command (command 255). Where it is the reset command (255), the process of resetting the counter 444 for the joystick 45 is performed at a step S61.

Where the CPU 11 outputs a reset command (command 255), the data shown in FIG. 19 is transmitted and received between the image processing apparatus 10 and the controller 40. That is, the control circuit 442 of the controller 40, if receiving command 255 data configured by 1 byte (8 bits), outputs a reset signal to reset the X counter 444X and the counter 444Y, and transmits aforesaid TYPE L (1 byte), TYPE H (1 byte) and the status.

Figure 20:
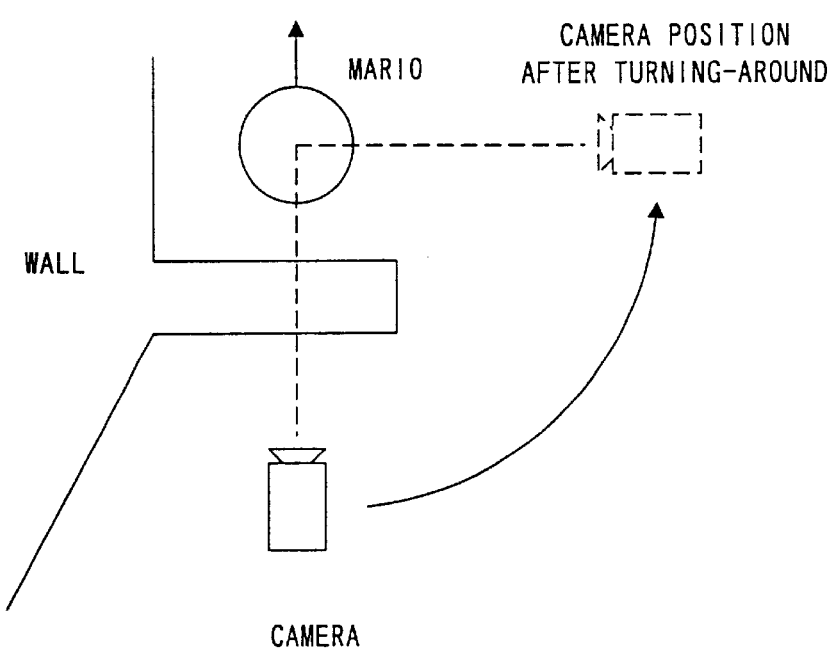
FIG. 20 is an illustrative view showing a state when a wall exists between the operable object (Mario) and the camera.

An explanation is now made concerning changing the camera perspective (point of eye) in a three-dimensional space. That is, where in the conventional 3D game there exists between a camera and an operable object (e.g., Mario) another object (e.g., a wall or an opponent character) as shown in FIG. 20, the operable object or Mario cannot be viewed or "photographed" by the camera. In contrast, it is possible in the present invention to continuously display Mario at all times by turning the camera around Mario up to a lateral side thereof as shown in FIG. 20.

Figure 21:
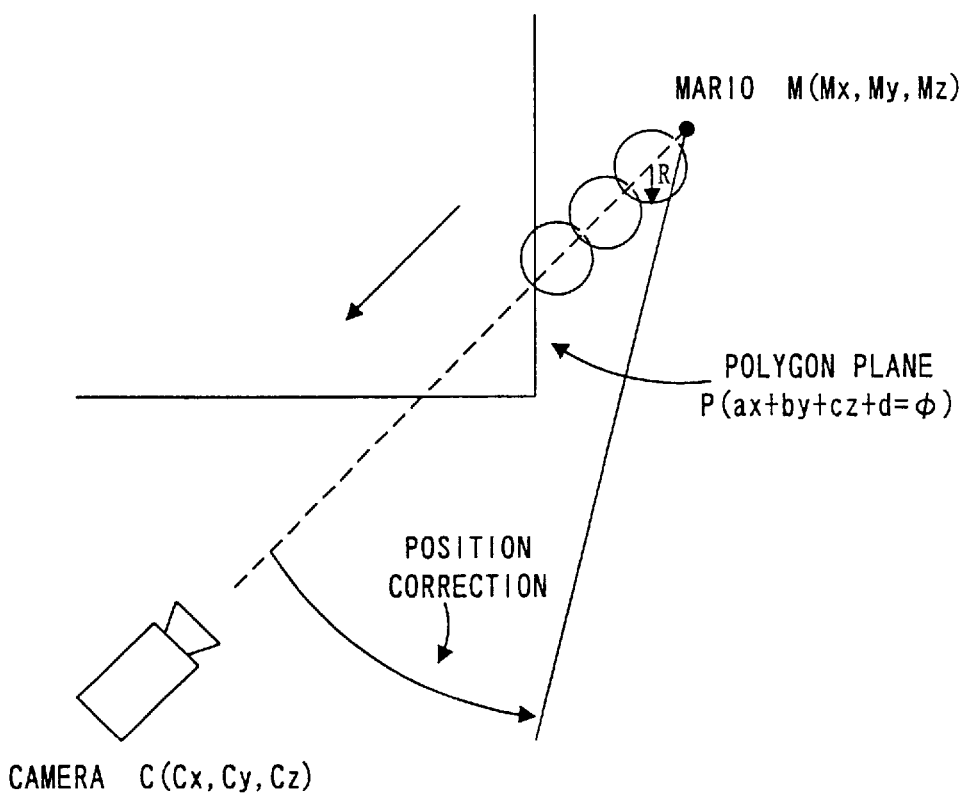
FIG. 21 is an illustrative view showing point of view movement regarding FIG. 20.

Stated briefly, where the objects are situated as shown in FIG. 21, a determination is made of a collision with a topographical polygon extending from Mario's side, at several points on a straight line between Mario and camera. On this occasion, a check is made for a polygon that is perpendicular to an XZ plane inside a radius R from each point. The process of turning-around of the camera is performed on a polygon P determined as collisional. The wall surface P is expressed by the flat-plane equation as given by Equation (1).

$$Ax+By+Cz+D=0 \tag{1}$$

The correction in camera position is done by moving the "camera" in parallel with this plane P. Incidentally, the angle of Y-axis in parallel with the plane is calculated by the flat-plane equation.

Figure 22:
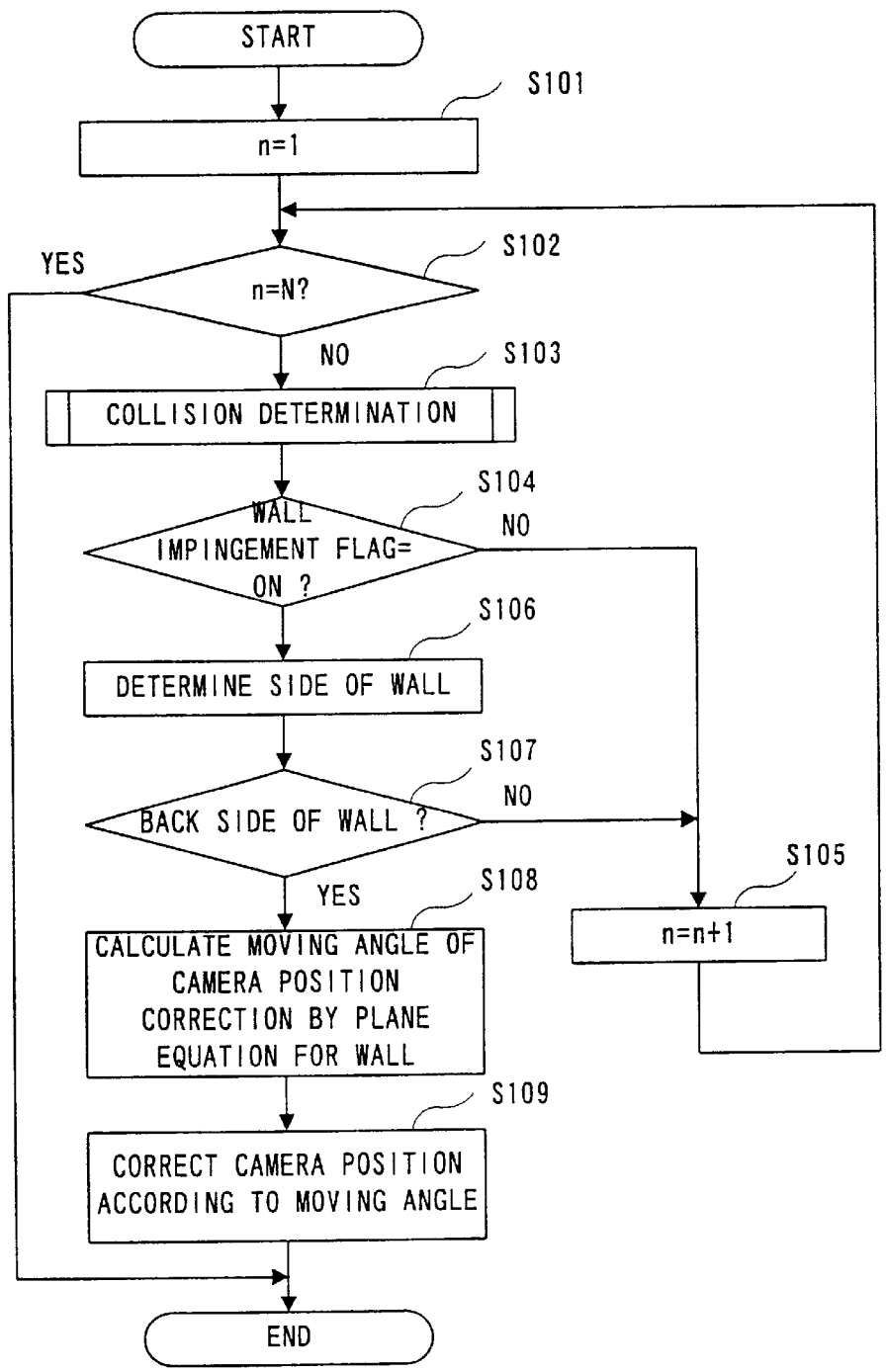
FIG. 22 is a flowchart showing operation for a camera turning-around process.

Explaining in further detail in conjunction with the FIG. 22 flowchart, the No. n of a polygon to be collision-determined is initialized (n=1) at a first step S101. At a next step S102, it is determined whether or not the number N of polygons to be checked for and the polygon No. are equal, that is, whether or not a collision-determination has been made at a next step S103.

Figure 23:
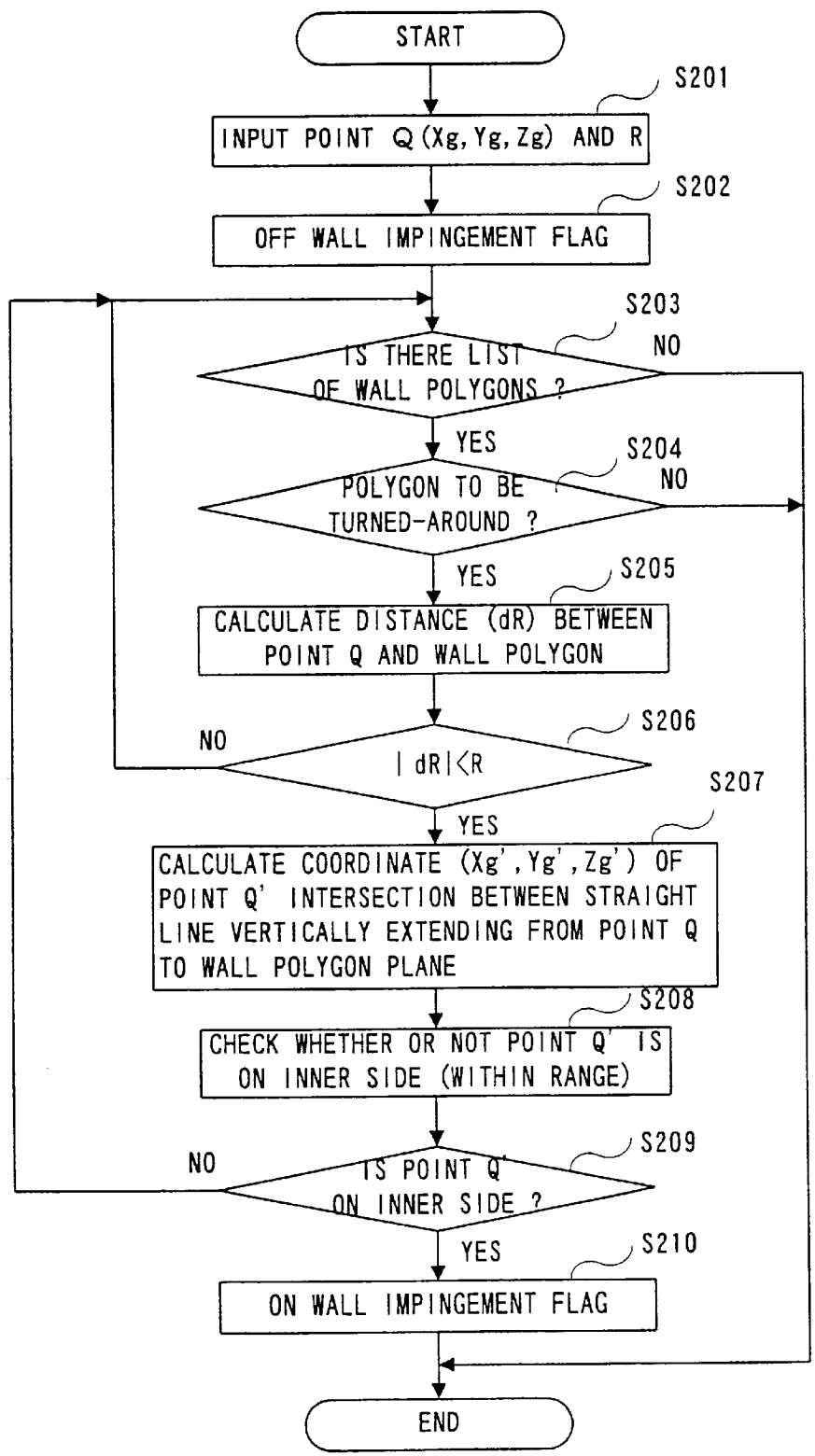
FIG. 23 is a flowchart showing a collision-determining routine.
Figure 24:
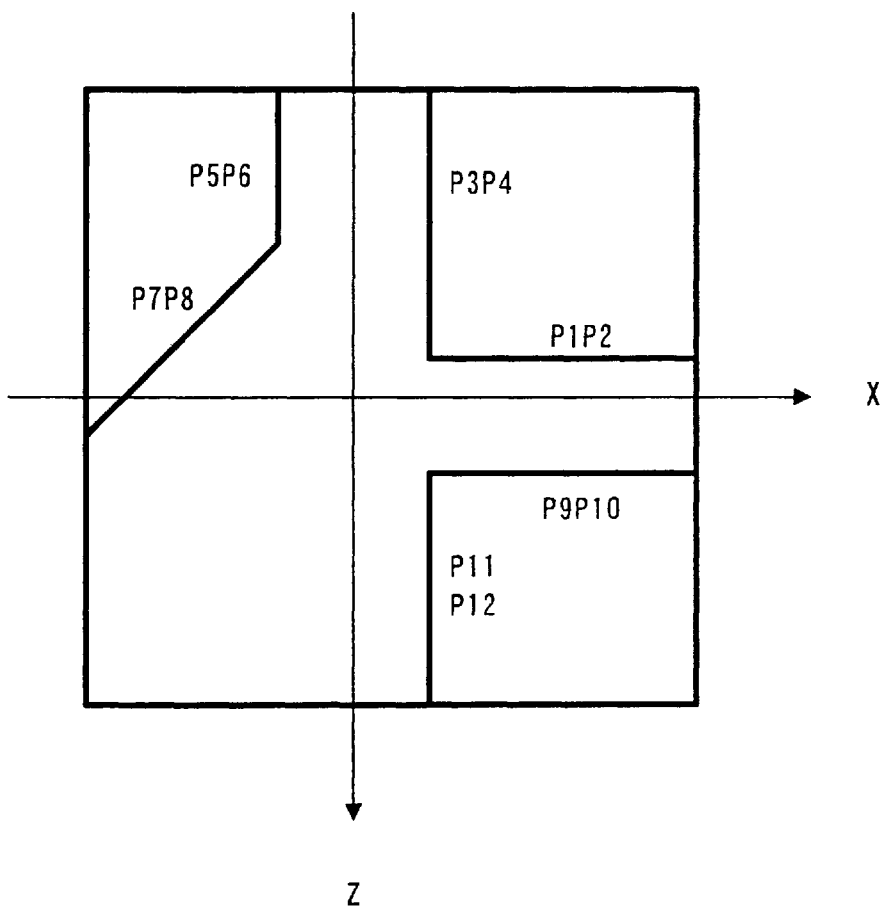
FIG. 24 is an illustrative view showing a wall polygon.
Figure 25:
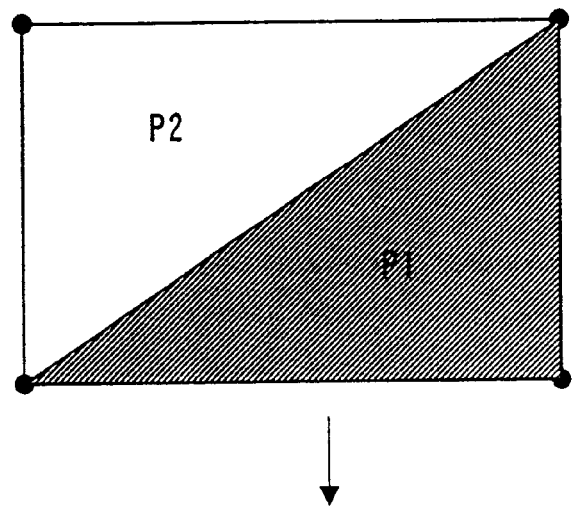
FIG. 25 is an illustrative view showing each polygon.

FIG. 23 shows in detail step S103, i.e., an illustrative collision-determination routine. Before explaining this collision-determination routine, reference is made to FIG. 24 and FIG. 25 which show wall data to be collision-determined. That is, the wall data is depicted as in FIG. 24 wherein triangular polygons as in FIG. 25 are gathered together. These respective polygons are stored as listing of wall polygons in a memory.

At a first step S201 in FIG. 23, a point Q (Xg, Yg, Zg) and a radius R are input. The point Q is a point to be checked and the radius R is a distance considered to be collisional against the wall. At a next step S202, a wall-impingement flag is reset. At a step S203, it is determined whether or not the wall-polygon list explained hereinbefore is stored in the memory. If there exists a wall polygon list, it is determined at a next step 204 whether or not the same polygon is a polygon to be processed by turning around of the camera. At this step S204, If so, the process proceeds to a step S205.

At the step S205, the distance (dR) between the point Q and the plane of wall polygon is calculated according to Equation (2).

$$dR = AXg + BYg + CZg + D \tag{2}$$

Then at a step S206 it is determined whether or not the distance dR calculated at the step S205 is smaller than the radius R. When the distance dR is greater than the radius R, there occurs no collision between the Mario and the wall, and accordingly the process returns back to the aforesaid step S203.

If "Yes" is determined at the step S206, that is, when $|dR|<R$, a calculation is made at a step S207 according to Equation (3) for determining positional coordinate (Xg', Yg', Zg') of a point of intersection Q' between a straight line extending from the point Q vertically to the wall polygon P and the plane of the wall polygon.

$$Xg' = Xg + A \times dR$$

$$Yg' = Yg + B \times dR$$

$$Zg' = Zg + C \times dR \tag{3}$$

Then at a next step S208, it is determined whether to not the point Q' is on the inner side of the polygon (within the range).

Figure 26:
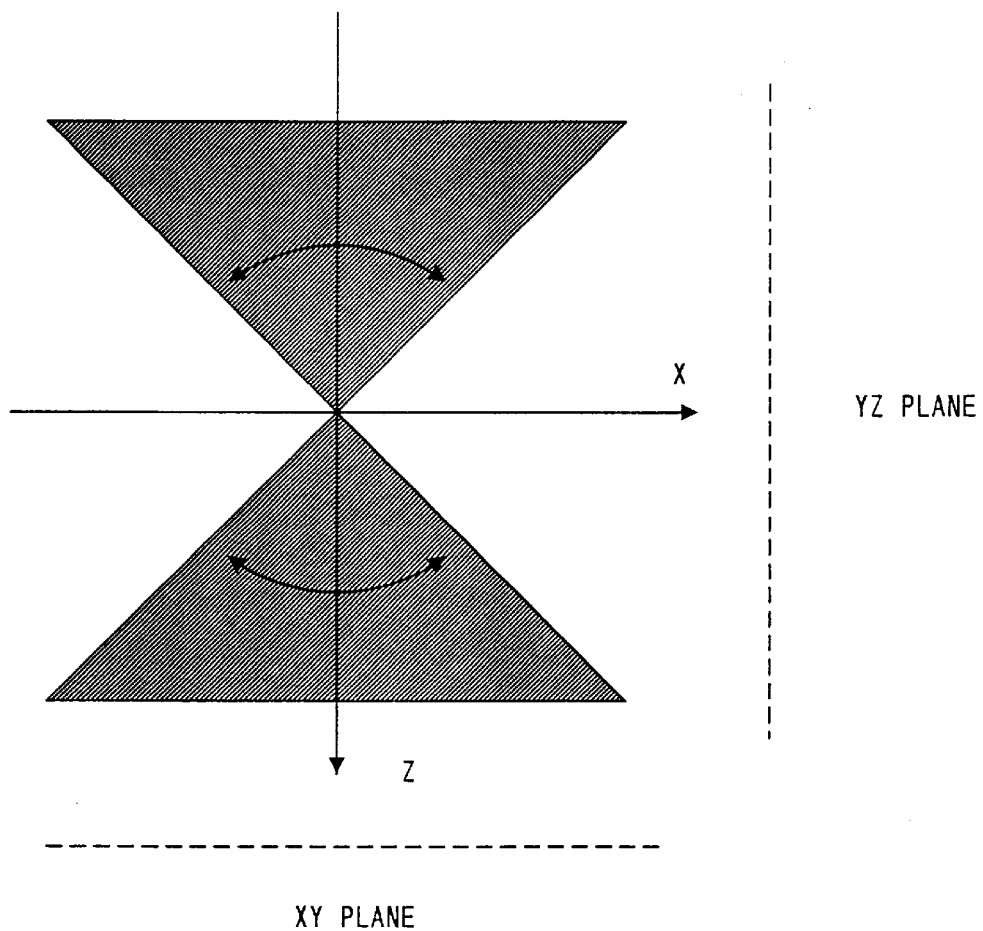
FIG. 26 is an illustrative view showing a projected surface.
Figure 27:
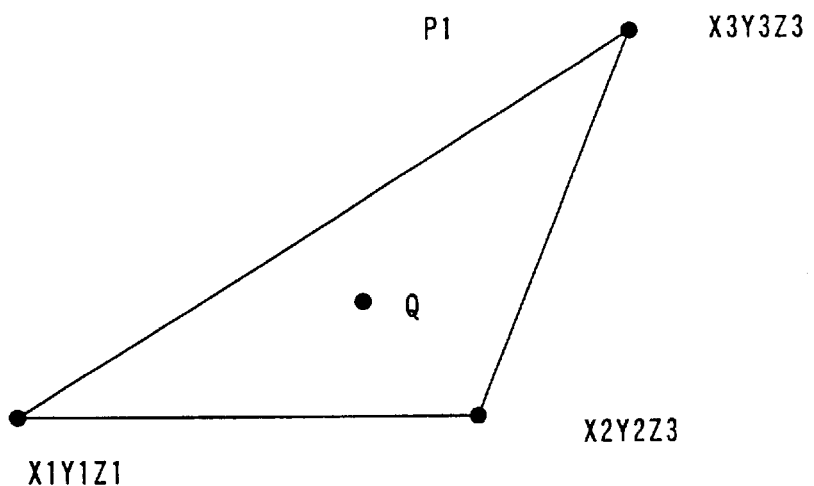
FIG. 27 is an illustrative view showing a state that a projection is onto a YX plane.

At step S208, it is determined onto which plane projection is to be made in dependence upon the direction of the wall (a value A). That is, when A<−0.707 or A>0.707, projection is onto a YZ plane shown in FIG. 26. Otherwise, projection is onto an XY plane. Where the projection is onto the YZ plane, it is determined whether or not in FIG. 27 the point Q' is on an inner side of the polygon P1.

Figure 28:
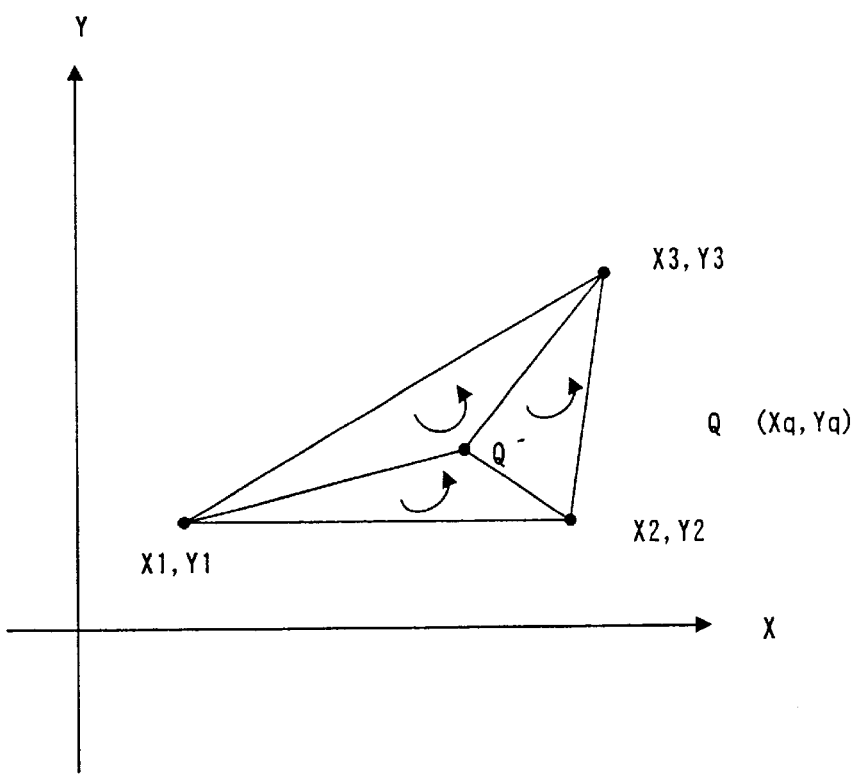
FIG. 28 is an illustrative view showing a state that a projection is onto an XY plane.

Meanwhile, where projection is onto the XY plane, it is determined on the point Q' and apexes of the polygon P1 in FIG. 28 whether, the value of counterclockwise cross product is positive or negative. That is, when C in the polygon-plane equation is $C \geq 0$, if each of the resulting cross products is 0 or negative, then determination is that the point Q' is on the inner side of the polygon P.

$$(Y1-Yq) \times (X2-X1) - (X1-Xq) \times (Y2-Y1) \leq 0$$

$$(Y2-Yq) \times (X3-X2) - (X2-Xq) \times (Y3-Y2) \leq 0$$

$$(Y3-Yq) \times (X1-X3) - (X3-Xq) > (Y1-Y3) \leq 0 \tag{4}$$

Meanwhile, when C<0, if each of the resulting cross products is 0 or positive, then determination is that the point Q' is on the inner side of the polygon P.

$$(Y1-Yq) \times (X2-X1) - (X1-Xq) \times (Y2-Y1) \geq 0$$

$$(Y2-Yq) \times (X3-X2) - (X2-Xq) \times (Y3-Y2) \geq 0$$

$$(Y3-Yq) \times (X1-X3) - (X3-Xq) > (Y1-Y3) \geq 0 \tag{5}$$

In this manner the point Q' is checked at the step S208 whether it is on the inner side of the polygon or not, and at a step 209 it is determined whether or not the point Q' is on the inner side of the polygon. If "Yes" at this step S209, the wall-impingement flag that had been reset at the aforesaid step S202 is set (step S210). Thereafter the process returns to FIG. 22.

Note that the abovestated collision-determination is merely one example, and it should be recognized that the collision-determination is possible by other methods.

Figure 29:
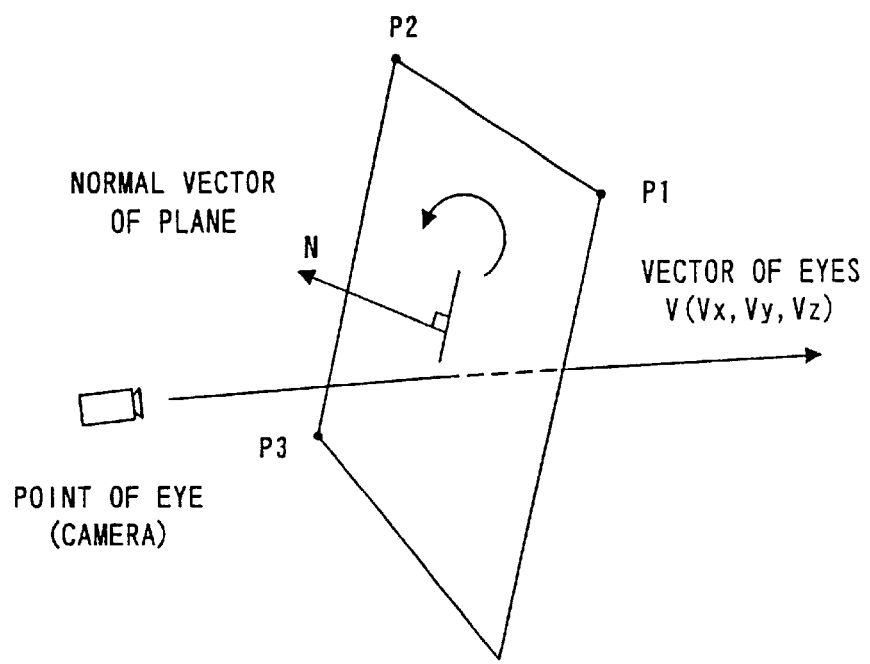
FIG. 29 is an illustrative view showing a normal vector of the plane and a point of view vector of the camera.

Referring back to FIG. 22, after the collision-determination at the step S103, it is determined at a step S 104 whether or not a wall-impingement flag is set. If "No" at this step S104, the process of turning around is unnecessary, so that the No. n of a point to be checked is incremented at step S105 and the process returns back to the step S102.

f "Yes" at the step S104, it is determined at step S106 and step S107 whether it is on a back side of the wall. That is, the directionality of the polygon is determined. Whether the polygon is directed to the camera (the point of view) or not can be determined by examining the sign of the dot product of a normal vector N and an eye (point of view) vector V in FIG. 29. The conditional expression therefore is given by Equation (6).

$$A = V \cdot N = VxNx + VyNy + VzNz \tag{6}$$

With Equation (6), determinations are respectively possible such that if $A \geq 0$ the wall is directed to the camera (frontward) while if A<0 the wall is directed to a backside of the wall. If a plane existing between the camera and Mario is directed frontward relative to the camera, the turning-around of camera in FIG. 30 is not done. In this case, the No. n of the point is incremented at a step S105, and the process returns back to the step S102.

If the plane between the camera and Mario is directed backward, the answer to the step S107 becomes "Yes", and the turning-around process is carried out at subsequent steps S108 and S109. At the step S108, the angle of movement through which the position of camera (photographing position) is altered based on the flat-plane equation for the wall. That is, the flat-plane equation in terms of three points P1 (X1, Y1, Z1), P2(X2, Y2, Z2), P3 (X3, Y3, Z3) on the flat-plane equation is expressed by a multi-term equation of Equation (7).

$$Ax + By + Cz + D = 0$$

where, $A = Y1(Z2-Z3) + Y2(Z3-Z1) + Y3(Z1-Z2)$ $B = Z1(X2-X3) + Z2(X3-X1) + Z3(X1-X2)$ $C = X1(Y2-Y3) + X2(Y3-Y1) + X3(Y1-Y2)$ $D = X1(Y2Z3-Z2Y3) + Y1(Z2X3-X2Z3) + Z1(X2Y3-Y2X3) \tag{7}$ The angle Ry of the normal vector with respect to the Y-axis is given by Equation (8).

$$Ry = \tan^{-1}(A/C) \tag{8}$$

Therefore, the turning-around angle of camera is either Ry+90° or Ry−90°. That is, at the step S109 the camera is rotationally moved about Mario, or the operable object, in either direction Ry+90° or Ry−90°. Specifically, the movement is to a location closer to the presently-situated camera position (C in FIG. 21).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus for use in displaying an image of a first object and a second object existing in a three-dimensional space from a predetermined point of view, comprising:

an external memory for storing data relating to the first object, the second object, and a predetermined program;

an input device which inputs data that alters the position of one of the first object and the second object in the three-dimensional space;

object position data generating circuitry which generates object position data so as to alter the position of at one of the first object and the second object in the three-dimensional space;

three-dimensional data generating circuitry for creating three-dimensional data based on the data stored in said external memory and the object position data;

a point of view position data generator for generating position data representative of a point of view position in the three-dimensional space for viewing the first object;

a detector for automatically detecting whether or not the second object is existent between the viewing position and the first object position;

point of view position data altering processing circuitry for automatically altering the point of view position data such that the second object is not existent between the point of view position and the first object position when said detector detects existence of the second object;

a display data generator for displaying the image of the first object from a predetermined position in the three-dimensional space based on the three-dimensional data and the point of view position data; and image signal generating circuitry which outputs an image signal to said display based on the display data created by said display data creating generator.

2. A three-dimension image processing apparatus according to claim 1, wherein said detector includes collision determining circuitry which determines whether or not the first object collides with the second object.

3. A three-dimensional image processing apparatus according to claim 1, wherein the first object is a player controlled object, and wherein said point of view position data altering processing circuitry includes a moving-angle setting means which sets a moving angle at which the second object becomes nonexistent between the point of view position and the player controlled object position.

4. A video game system comprising:

a removable external memory for storing a video game program and for storing image data representative of a first object and a second object;

a memory port for receiving said external memory;

a game program executing processing system for executing said video game program to generate a three-dimensional world display;

at least one player controller coupled to said game program executing processing system operable by a player including a plurality of control keys for generating video game control signals for controlling the position of one of a first object and a second object; said external memory including point of view modifying instructions for automatically determining in response to a player's control key actuation when an obstructed view exists of said first object or said second object and for modifying the displayed three-dimensional world point of view in order to enable unobstructed viewing of one of said first object and said second object.

5. A video game system according to claim 4, wherein the first object is a player controlled object, and wherein said three-dimensional world is displayed in accordance with a first camera mode and wherein said point of view modifying instructions cause said game program executing processing system to detect whether a player controlled character has been controlled to be in a predetermined display state, and for automatically changing from said first camera mode to another camera mode if said predetermined display state is detected.

6. A video game system according to claim 4, wherein the first object is a player controlled object, and wherein said point of view modifying instructions cause said game program executing processing system to detect whether said second object exists between the player controlled character and a current point of view perspective such that the player controlled character would not be visible on a display screen and changing the current point of view such that the player controlled character will be displayed.

7. For use in a video game system having an external memory for storing a video game program, a game program executing processing system for executing said video game program, at least one player controller operable by a player for generating player controller related data, said player controller having a plurality of player control switches, a method of operating said video game system comprising the steps of:

generating a first three-dimensional world display from a first point of view in which a first object and a second object are depicted in the three-dimensional world;

detecting in response to player manipulation of one of said player control switches whether there is an obstructed view of the first or second object and a need to change the first point of view display in order to enable unobstructed viewing of one of said first object and said second object, and automatically generating a second three-dimensional world display from a second point of view in response to detecting said need to change the first point of view display.

8. For use with a video game system console having a game program executing processing system for executing said video game program to create a display simulating a three-dimensional world, and at least one player controller having a plurality of control keys and operable by a player to generate video game control signals, a portable storage device for controlling the operation of said video game system console comprising:

a memory media for storing video game instructions and graphics data;

said video game instructions including instructions for causing said game program executing processing system in response to a player's actuation of at least one of said control keys to execute instructions for automatically changing the displayed point of view perspective in a displayed three-dimensional world upon detecting an obstructed view of a first object by another object such that the first object can be continuously viewed without obstruction from other objects in said three-dimensional world.

9. A method according to claim 8, wherein the first object is a player controlled object, and further including the steps of detecting whether said second object exists between the player controlled character and a current point of view perspective such that the player controlled character would not be visible on a display screen with respect to the current point of view; and changing the current point of view such that the player controlled character will be displayed.

10. A portable storage device in accordance with claim 8, wherein said controller includes a joystick control member and wherein said video game instructions further include instructions for rotating the three-dimensional display perspective in response to a player actuating said joystick control member.

11. A portable storage device in accordance with claim 8, wherein the first object is a player controlled object, wherein said video game instructions further include instructions for detecting whether a second object exists between the player controlled character and a current point of view perspective such that the player controlled character would not be visible on a display screen when viewed from said current point of view perspective and changing the current point of view such that the player controlled character will be displayed.

12. For use with a video game system console having a game program executing processing system for executing said video game program to generate a three-dimensional world display, and at least one player controller operable by a player to generate video game control signals and including command processing circuitry; a portable storage device for controlling the operation of said video game system console comprising:

a memory media for storing video game instructions and graphics data for at least a first object;

a memory media interface for coupling said video game instructions and said graphics data retrieved from said memory media to said video game system console;

said video game instructions including at least one player controller related instruction for causing said game program executing processing system to send a command to said player controller for decoding and processing, said video game instructions further including point of view modifying instructions for automatically determining in response to a player's operation of said player controller when an obstructed view exists of said first object and for modifying the displayed three-dimensional world point of view in order to maintain an unobstructed view of said first object in said three-dimensional world.

* * * * *